United States Patent
Wu et al.

(10) Patent No.: US 12,225,568 B2
(45) Date of Patent: Feb. 11, 2025

(54) METHOD AND DEVICE IN COMMUNICATION NODES FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 778 days.

(21) Appl. No.: 17/467,290

(22) Filed: Sep. 6, 2021

(65) Prior Publication Data

US 2022/0078816 A1 Mar. 10, 2022

(30) Foreign Application Priority Data

Sep. 7, 2020 (CN) .......................... 202010927989.6

(51) Int. Cl.
*H04W 72/12* (2023.01)
*H04W 72/50* (2023.01)

(52) U.S. Cl.
CPC ................. *H04W 72/535* (2023.01)

(58) Field of Classification Search
CPC . H04W 72/0446; H04W 72/21; H04W 72/52; H04W 52/08
See application file for complete search history.

(56) References Cited

U.S. PATENT DOCUMENTS

| | | | |
|---|---|---|---|
| 2021/0068140 A1* | 3/2021 | Yang | H04W 72/21 |
| 2023/0198682 A1* | 6/2023 | Khoshnevisan | H04L 5/0053 |
| | | | 370/329 |
| 2023/0209509 A1* | 6/2023 | Khoshnevisan | H04W 52/08 |
| | | | 370/329 |

* cited by examiner

*Primary Examiner* — Romani Ohri

(57) ABSTRACT

The present disclosure provides a method and device in communication nodes for wireless communications. A first node receives a first information block, a second information block and a third information block; when a first condition set is satisfied, transmits a first bit block and a second bit block in a first time-frequency resource block; when the first condition set is not satisfied, transmits the second bit block in the second time-frequency resource block, and transmits the second bit block in the third time-frequency resource block. The first time-frequency resource block is reserved for the first bit block; the second time-frequency resource block and the third time-frequency resource block are respectively reserved for two repetitions of the second bit block; whether the first condition set is satisfied is used to determine whether to drop transmitting the first bit block in the first time-frequency resource block.

20 Claims, 5 Drawing Sheets ical Field

The present disclosure relates to transmission methods and devices in wireless communication systems, and in particular to a method and device of radio signal transmission in wireless communication systems supporting cellular networks.

Related Art

NR Rel-16 standard can support downlink transmissions of a plurality of Transmit-Receive Points (TRPs) and/or antenna panels, and supports a piece of Downlink Control Information (DCI) scheduling downlink transmissions of a plurality of TRPs and/or antenna panels as well as supports a plurality pieces of DCI respectively scheduling downlink transmissions of a plurality of TRPs or antenna panels.

A work item (WI) of Multiple Input and Multiple Output (MIMO) enhancement of NR Release 17 was approved at 3GPP RAN #86 plenary, where utilizing a plurality TRPs and/or antenna panels to enhance uplink channels is a work focus, such as a Physical Uplink Control CHannel (PUCCH) and a Physical Uplink Shared CHannel (PUSCH).

METHOD AND DEVICE IN COMMUNICATION NODES FOR WIRELESS COMMUNICATION

CROSS REFERENCE TO RELATED APPLICATIONS

This application claims the priority benefit of Chinese Patent Application No. 202010927989.6, filed in Sep. 7, 2020, the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

NR Rel-16 standard can support downlink transmissions of a plurality of Transmit-Receive Points (TRPs) and/or antenna panels, and supports a piece of Downlink Control Information (DCI) scheduling downlink transmissions of a plurality of TRPs and/or antenna panels as well as supports a plurality pieces of DCI respectively scheduling downlink transmissions of a plurality of TRPs or antenna panels.

A work item (WI) of Multiple Input and Multiple Output (MIMO) enhancement of NR Release 17 was approved at 3GPP RAN #86 plenary, where utilizing a plurality TRPs and/or antenna panels to enhance uplink channels is a work focus, such as a Physical Uplink Control CHannel (PUCCH) and a Physical Uplink Shared CHannel (PUSCH).

SUMMARY

The inventors have found through researches that repetition is an important technology to improve transmission reliability; when a plurality of transmissions conflict in time domain, one of which is a repetition, how to solve the conflicts among them is a key issue to be studied.

To address the above problem, the present disclosure provides a solution. In description of the above problem, an uplink is illustrated as an example. The present disclosure is also applicable to transmission scenarios of downlink and sidelink to achieve technical effects similar in sidelink. Additionally, the adoption of a unified solution for various scenarios (including but not limited to uplink, downlink and sidelink) contributes to the reduction of hardcore complexity and costs. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first information block, a second information block and a third information block;
  when a first condition set is satisfied, transmitting a first bit block and a second bit block in a first time-frequency resource block, dropping transmitting the second bit block in a second time-frequency resource block, and dropping transmitting the second bit block in a third time-frequency resource block; and
  when the first condition set is not satisfied, dropping transmitting the first bit block in the first time-frequency resource block, transmitting the second bit block in the second time-frequency resource block, and transmitting the second bit block in the third time-frequency resource block;
  herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one embodiment, a problem to be solved in the present disclosure is: when a plurality of transmissions conflict in time domain, one of which is a repetition, how to solve conflicts among them.

In one embodiment, a problem to be solved in the present disclosure is: when repetitions of a Physical Uplink Shared CHannel (PUSCH) and two Physical Uplink Control CHannel conflict in time domain, how to solve the conflicts among them.

In one embodiment, the essence of the above method is that a first index corresponds to a beam of a second time-frequency resource block, and a second index corresponds to a beam of a third time-frequency resource block; when a first condition set is satisfied, a second bit block is multiplexed to be transmitted in time-frequency resources reserved for a first bit block; when a first condition set is not satisfied, a first bit block is dropped to be transmitted in a first time-frequency resource block, and a second bit block is transmitted in reserved second time-frequency resource block and third time-frequency resource block. Adopting the above method is advantageous in guaranteeing diversity gains of transmission of the second bit block and reducing influence of beam blocking.

In one embodiment, the essence of the above method is that a first time-frequency resource block is a PUSCH, a second time-frequency resource block and a third time-frequency resource block are repetitions of a PUCCH, a first bit block is a Transport Block (TB) or a Code Block Group (CBG), a second bit block is Uplink control information (UCI), and a first index and a second index are respectively two beams used for repetitions of the PUCCH; when a first condition set is satisfied, the UCI is multiplexed to be transmitted in the PUSCH; when a first condition set is not satisfied, the PUSCH is dropped to be transmitted, and the UCI is repeatedly transmitted in the PUCCH. Adopting the above method is advantageous in guaranteeing diversity gains of UCI transmissions and reducing the influence of beam blocking.

According to one aspect of the present disclosure, the above method is characterized in that the first time-frequency resource block comprises M resource sub-blocks, spatial relations of the M resource sub-blocks are the same, M being a positive integer greater than 1.

According to one aspect of the present disclosure, the above method is characterized in comprising:
  when the first condition set is satisfied, executing a first behavior;
  herein, the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

According to one aspect of the present disclosure, the above method is characterized in that an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time.

According to one aspect of the present disclosure, the above method is characterized in comprising:
  receiving a fourth information block;
  herein, the fourth information block is used to determine the first time; when the first condition set is satisfied, the first information block is used to indicate that the first behavior is executed.

According to one aspect of the present disclosure, the above method is characterized in comprising:
  transmitting a first reference signal, or receiving a first reference signal; and
  transmitting a second reference signal, or, receiving a second reference signal;
  herein, the first index is used to indicate the first reference signal, and the second index is used to indicate the second reference signal.

According to one aspect of the present disclosure, the above method is characterized in comprising:
  receiving a first signal in a fourth time-frequency resource block;
  herein, the second information block is used to indicate the fourth time-frequency resource block, and the second bit block is used to indicate whether the first signal is correctly received.

The present disclosure provides a method in a second node for wireless communications, comprising:
  transmitting a first information block, a second information block and a third information block;
  when a first condition set is satisfied, receiving a first bit block and a second bit block in a first time-frequency resource block, dropping receiving the second bit block in a second time-frequency resource block, and dropping receiving the second bit block in a third time-frequency resource block; and
  when the first condition set is not satisfied, dropping receiving the first bit block in the first time-frequency resource block, receiving the second bit block in the second time-frequency resource block, and receiving the second bit block in the third time-frequency resource block;
  herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

According to one aspect of the present disclosure, the above method is characterized in that the first time-frequency resource block comprises M resource sub-blocks, spatial relations of the M resource sub-blocks are the same, M being a positive integer greater than 1.

According to one aspect of the present disclosure, the above method is characterized in comprising:
  when the first condition set is satisfied, executing a first behavior;
  herein, the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

According to one aspect of the present disclosure, the above method is characterized in that an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time.

According to one aspect of the present disclosure, the above method is characterized in comprising:
transmitting a fourth information block;
herein, the fourth information block is used to determine the first time; when the first condition set is satisfied, the first information block is used to indicate that the first behavior is executed.

According to one aspect of the present disclosure, the above method is characterized in comprising:
receiving a first reference signal, or, transmitting a first reference signal; and
receiving a second reference signal, or, transmitting a second reference signal;
herein, the first index is used to indicate the first reference signal, and the second index is used to indicate the second reference signal.

According to one aspect of the present disclosure, the above method is characterized in comprising:
transmitting a first signal in a fourth time-frequency resource block;
herein, the second information block is used to indicate the fourth time-frequency resource block, and the second bit block is used to indicate whether the first signal is correctly received.

The present disclosure provides a first node for wireless communication, comprising:
a first receiver, receiving a first information block, a second information block and a third information block; and
a first transmitter, when a first condition set is satisfied, transmitting a first bit block and a second bit block in a first time-frequency resource block, dropping transmitting the second bit block in a second time-frequency resource block, and dropping transmitting the second bit block in a third time-frequency resource block; when the first condition set is not satisfied, dropping transmitting the first bit block in the first time-frequency resource block, transmitting the second bit block in the second time-frequency resource block, and transmitting the second bit block in the third time-frequency resource block;
herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

The present disclosure provides a second node for wireless communications, comprising:
a second transmitter, transmitting a first information block, a second information block and a third information block; and
a second receiver, when a first condition set is satisfied, receiving a first bit block and a second bit block in a first time-frequency resource block, dropping receiving the second bit block in a second time-frequency resource block, and dropping receiving the second bit block in a third time-frequency resource block; when the first condition set is not satisfied, dropping receiving the first bit block in the first time-frequency resource block, receiving the second bit block in the second time-frequency resource block, and receiving the second bit block in the third time-frequency resource block;
herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one embodiment, the method in the present disclosure is advantageous in the following aspects:

diversity gains of transmissions are guaranteed and influence of beam blocking is reduced.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
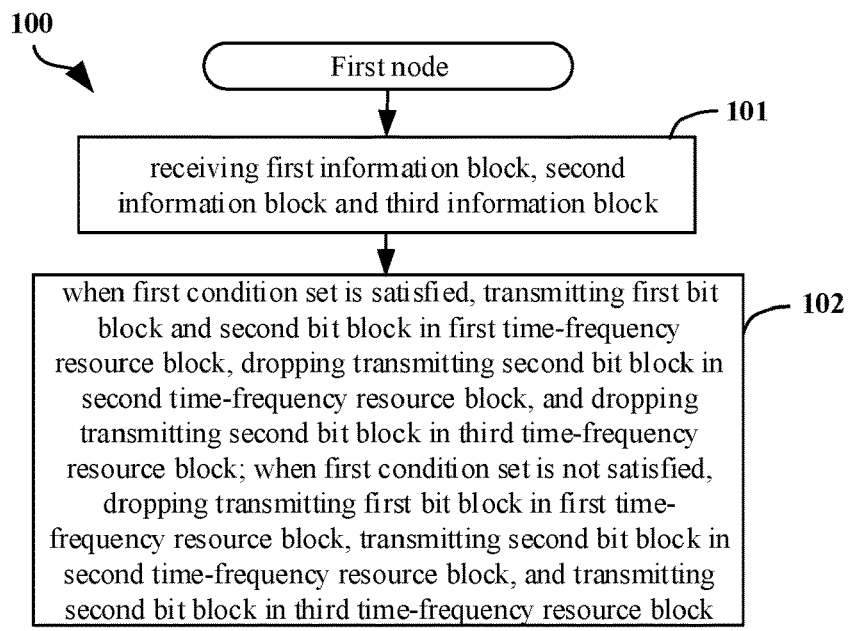
FIG. 1 illustrates a flowchart of a first information block, a second information block, a third information block, a first bit block and a second bit block according to one embodiment of the present disclosure.

Embodiment 1 illustrates a flowchart of a first information block, a second information block, a third information block, a first bit block and a second bit block according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives a first information block, a second information block and a third information block in step 101; when a first condition set is satisfied in step 102, transmits a first bit block and a second bit block in a first time-frequency resource block, drops transmitting the second bit block in a second time-frequency resource block, and drops transmitting the second bit block in a third time-frequency resource block; when the first condition set is not satisfied, drops transmitting the first bit block in the first time-frequency resource block, transmits the second bit block in the second time-frequency resource block, and transmits the second bit block in the third time-frequency resource block; herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one embodiment, a transmission of the third information block is earlier than a transmission of the second information block.

In one embodiment, a transmission of the third information block is earlier than a transmission of the first information block.

In one embodiment, a transmission of the third information block is not earlier than a transmission of the first information block.

In one embodiment, a transmission of the first information block is earlier than a transmission of the second information block.

In one embodiment, a transmission of the first information block is later than a transmission of the second information block.

In one embodiment, a transmission of the first information block is not earlier than a transmission of the second information block.

In one embodiment, the first information block is semi-statically configured.

In one embodiment, the first information block is carried by a higher-layer signaling.

In one embodiment, the first information block is carried by a Radio Resource Control (RRC) signaling.

In one embodiment, the first information block is carried by a MAC CE signaling.

In one embodiment, the first information block comprises a plurality of Information Elements (IEs) in an RRC signaling.

In one embodiment, the first information block comprises an IE in an RRC signaling.

In one embodiment, the first information block comprises partial fields of an IE in an RRC signaling.

In one embodiment, the first information block comprises a ConfiguredGrantConfig IE in an RRC signaling.

In one embodiment, the first information block comprises a timeDomainAllocation field and a frequencyDomainAllocation field.

In one embodiment, the specific meaning of the ConfiguredGrantConfig IE can be found in 3GPP TS38.214, section 6.1.2.3.

In one embodiment, the specific meaning of the timeDomainAllocation field can be found in 3GPP TS38.214, section 6.1.2.3, and the specific meaning of the frequencyDomainAllocation field can be found in 3GPP TS38.214, section 6.1.2.3.

In one embodiment, the first information block is dynamically configured.

In one embodiment, the first information block is carried by a physical-layer signaling.

In one embodiment, the first information block is carried by a DCI signaling.

In one embodiment, the first information block is carried by an Uplink Grant DCI signaling.

In one embodiment, the first information block schedules a Physical Uplink Shared CHannel (PUSCH).

In one embodiment, the first information comprises a Time domain resource assignment field and a Frequency domain resource assignment field.

In one embodiment, the specific meaning of the Time domain resource assignment can be found in 3GPP TS38.212, section 7.3, and the specific meaning of the Frequency domain resource assignment field can be found in 3GPP TS38.212, section 7.3.

In one embodiment, the first time-frequency resource block comprises at least one Resource Element (RE), the second time-frequency resource comprises at least one RE, and the third time-frequency resource comprises at least one RE.

In one embodiment, time-domain resources occupied by the first time-frequency resource block comprise at least one symbol, time-domain resources occupied by the second time-frequency resource block comprise at least one symbol, and time-domain resources occupied by the third time-frequency resource block comprise at least one symbol.

In one embodiment, time-domain resources occupied by the first time-frequency resource block comprise more than one symbol, time-domain resources occupied by the second time-frequency resource block comprise at least one symbol, and time-domain resources occupied by the third time-frequency resource block comprise at least one symbol.

In one embodiment, frequency-domain resources occupied by the first time-frequency resource block comprise at least one subcarrier, frequency-domain resources occupied by the second time-frequency resource block comprise at least one subcarrier, and frequency-domain resources occupied by the third time-frequency resource block comprise at least one subcarrier.

In one embodiment, frequency-domain resources occupied by the first time-frequency resource block comprise at least one Physical Resource Block (PRB), frequency-domain resources occupied by the second time-frequency resource block comprise at least one PRB, and frequency-domain resources occupied by the third time-frequency resource block comprise at least one PRB.

In one embodiment, frequency-domain resources occupied by the first time-frequency resource block comprise at least one Resource Block (RB), frequency-domain resources occupied by the second time-frequency resource block comprise at least one RB, and frequency-domain resources occupied by the third time-frequency resource block comprise at least one RB.

In one embodiment, an RE occupies a symbol in time domain, and occupies a subcarrier in frequency domain.

In one embodiment, the symbol is a multicarrier symbol.

In one embodiment, the symbol is a single carrier symbol.

In one embodiment, the first bit block comprises a Transport Block (TB).

In one embodiment, the first bit block comprises at least one TB.

In one embodiment, the first bit block comprises at least one Code Block Group (CBG).

In one embodiment, the first time-frequency resource block is reserved for transmission(s) of the first bit block.

In one embodiment, the first time-frequency resource block is reserved for a transmission of the first bit block.

In one embodiment, the first time-frequency resource block is reserved for at least one repetition of the first bit block.

In one embodiment, repetition time(s) of the first bit block in the first time-frequency resource block is equal to 1.

In one embodiment, repetition times of the first bit block in the first time-frequency resource block is greater than 1.

In one embodiment, the first time-frequency resource block is one of N1 time-frequency resource blocks, N1 being a positive integer greater than 1; any of the N1 time-frequency resource blocks is reserved for a transmission of the first bit block.

In one embodiment, time-domain resources occupied by the first time-frequency resource block and time-domain resources occupied by the second time-frequency resource block both comprise a same symbol, and time-domain resources occupied by the first time-frequency resource block and time-domain resources occupied by the third time-frequency resource block both comprise a same symbol.

In one embodiment, time-domain resources occupied by the first time-frequency resource block and time-domain resources occupied by the second time-frequency resource block both comprise at least one same symbol, and time-domain resources occupied by the first time-frequency resource block and time-domain resources occupied by the third time-frequency resource block both comprise at least one same symbol.

In one embodiment, the first information block explicitly indicates the first time-frequency resource block.

In one embodiment, the first information block implicitly indicates the first time-frequency resource block.

In one embodiment, the first information block indicates time-domain resources occupied by the first time-frequency resource block and frequency-domain resources occupied by the first time-frequency resource block.

In one embodiment, the first information block comprises a first field and a second field, the first field in the first information block indicates time-domain resources occupied by the first time-frequency resource block, and the second field in the first information block indicates frequency-domain resources occupied by the first time-frequency resource block.

In one embodiment, the first field is a timeDomainAllocation field, and the second field is a frequencyDomainAllocation field.

In one embodiment, the first field is a Time domain resource assignment field, and the second field is a Frequency domain resource assignment field.

In one embodiment, the first information block is used to indicate N1 time-frequency resource blocks, and the first time-frequency resource block is one of the N1 time-frequency resources, N1 being a positive integer greater than 1.

In one subembodiment of the above embodiment, N1 is indicated by the first information block.

In one subembodiment of the above embodiment, N1 is indicated by an RRC signaling.

In one subembodiment of the above embodiment, the first information block explicitly indicates N1 time-frequency resource blocks.

In one subembodiment of the above embodiment, the first information block implicitly indicates N1 time-frequency resource blocks.

In one subembodiment of the above embodiment, the first information block indicates time-domain resources occupied by the N1 time-frequency resource blocks and frequency-domain resources occupied by the N1 time-frequency resource blocks.

In one subembodiment of the above embodiment, the first information block indicates an earliest one of the N1 time-frequency resource blocks, and N1 is configured via an RRC signaling.

In one subembodiment of the above embodiment, the first information block indicates time-domain resources and frequency-domain resources occupied by an earliest one of the N1 time-frequency resource blocks, and N1 is configured via an RRC signaling.

In one subembodiment of the above embodiment, the first information block indicates an earliest one of the N1 time-frequency resource blocks and N1.

In one subembodiment of the above embodiment, the first information block indicates time-domain resources occupied by an earliest one of the N1 time-frequency resource blocks, frequency-domain resources occupied by an earliest one of the N1 time-frequency resource blocks and N1.

In one subembodiment of the above embodiment, the first information block comprises a first field and a second field, the first field in the first information block indicates time-domain resources occupied by the N1 time-frequency resource blocks, and the second field in the first information block indicates frequency-domain resources occupied by the first time-frequency resource block.

In one subembodiment of the above embodiment, the first information block comprises a first field and a second field, the first field in the first information block indicates time-domain resources occupied by an earliest one of the N1 time-frequency resource blocks, and the second field in the first information block indicates frequency-domain resources occupied by an earliest one of the N1 time-frequency resource blocks.

In one subembodiment of the above embodiment, the first information block comprises a first field and a second field, the first field in the first information block indicates time-domain resources occupied by an earliest one of the N1 time-frequency resource blocks and N1, and the second field in the first information block indicates frequency-domain resources occupied by an earliest one of the N1 time-frequency resource blocks.

In one embodiment, the second information block is semi-statically configured.

In one embodiment, the second information block is carried by a higher-layer signaling.

In one embodiment, the second information block is carried by an RRC signaling.

In one embodiment, the second information block is carried by a MAC CE signaling.

In one embodiment, the second information block comprises a plurality of IEs in an RRC signaling.

In one embodiment, the second information block comprises an IE in an RRC signaling.

In one embodiment, the second information block comprises partial fields of an IE in an RRC signaling.

In one embodiment, the second information block comprises an SPS-Config IE in an RRC signaling.

In one embodiment, the specific meaning of the SPS-Config IE can be found in 3GPP TS38.214, section 5.

In one embodiment, the second information block is dynamically configured.

In one embodiment, the second information block is carried by a physical layer signaling.

In one embodiment, the second information block is carried by a DCI signaling.

In one embodiment, the second information block is carried by a Downlink Grant DCI signaling.

In one embodiment, the second information block schedules a Physical Downlink Shared CHannel (PDSCH).

In one embodiment, the second bit block carries UCI.

In one embodiment, the second bit block carries a Hybrid Automatic Repeat reQuest-Acknowledgement (HARQ-ACK).

In one embodiment, the second bit block carries a Scheduling Request (SR).

In one embodiment, the second bit block carries Channel-State Information (CSI).

In one embodiment, the second bit block carries at least one of an HARQ-ACK, an SR or CSI.

In one embodiment, the CSI comprises at least one of a Channel-state information reference signal Resource Indicator (CRI), a Synchronization Signal/physical broadcast channel Block Resource Indicator (SSBRI), a Layer Indicator (LI), a Precoding Matrix Indicator (PMI), a Channel Quality Indicator (CQI), a Layer 1 Reference Signal Received Power (L1-RSRP), a Layer 1 Reference Signal Received Quality (L1-RSRQ) or a Layer 1 Signal to Interference and Noise Ratio (L1-SINR).

In one embodiment, repetition time(s) of the second bit block in the second time-frequency resource block is equal to 1.

In one embodiment, repetition time(s) of the second bit block in the third time-frequency resource block is equal to 1.

In one embodiment, the second time-frequency resource block and the third time-frequency resource block are respectively two of N2 time-frequency resource blocks, N2 being a positive integer greater than 2; the N2 time-frequency resource blocks are respectively reserved for N2 repetitions of the second bit block.

In one embodiment, the N2 time-frequency resource blocks respectively comprise two PUCCH repetitions.

In one embodiment, the second time-frequency resource block and the third time-frequency resource block are orthogonal in time domain.

In one embodiment, the second time-frequency resource block is earlier than the third time-frequency resource block in time domain.

In one embodiment, the second information block explicitly indicates the second time-frequency resource block and the third time-frequency resource block.

In one embodiment, the second information block implicitly indicates the second time-frequency resource block and the third time-frequency resource block.

In one embodiment, the second time-frequency resource block comprise Physical Uplink Control CHannel (PUCCH) resources, and the third time-frequency resource block comprises PUCCH resources.

In one embodiment, the second time-frequency resource block and the third time-frequency resource block respectively comprise two PUCCH repetitions.

In one embodiment, the second information block comprises a third field, and the third field in the second information block is used to indicate the second time-frequency resource block and the third time-frequency resource block; the third field in the second information block comprises at least one bit.

In one subembodiment of the above embodiment, the third field in the second information block indicates indexes of the second time-frequency resource block and the third time-frequency resource block in a reference time-frequency resource set.

In one subembodiment of the above embodiment, the third field in the second information block indicates an index of the second time-frequency resource block in a reference time-frequency resource set, the reference time-frequency resource set comprises at least one time-frequency resource block, and the reference time-frequency resource set is configured via an RRC signaling.

In one subembodiment of the above embodiment, the third field in the second information block indicates indexes of N2 time-frequency resource blocks in a reference time-frequency resource set, the second time-frequency resource block and the third time-frequency resource block are respectively two of N2 time-frequency resource blocks, N2 being a positive integer greater than 2.

In one subembodiment of the above embodiment, indexes of the second time-frequency resource block and the third time-frequency resource block in a reference time-frequency resource set are the same.

In one subembodiment of the above embodiment, indexes of the second time-frequency resource block and the third time-frequency resource block in a reference time-frequency resource set are different.

In one subembodiment of the above embodiment, the third field in the second information block is a PUCCH resource indicator field.

In one embodiment, the specific meaning of the PUCCH resource indicator field can be found in 3GPP TS38.212, section 7.3.1.

In one embodiment, whether the first condition set is satisfied is used to determine whether to drop transmitting the second bit block in the second time-frequency resource block and the third time-frequency resource block.

In one embodiment, whether the first condition set is satisfied is used to determine whether the second bit block is transmitted in the first time-frequency resource block or is transmitted in the second time-frequency resource block and the third time-frequency resource block.

In one embodiment, when the first condition set is satisfied, the first node transmits a first bit block and a second bit block in a first time-frequency resource block, the first node drops transmitting the second bit block in a second time-frequency resource block, and the first node drops transmitting the second bit block in a third time-frequency resource block; when the first condition set is not satisfied, the first node drops transmitting the first bit block in the first time-frequency resource block, the first node transmits the second bit block in the second time-frequency resource block, and the first node transmits the second bit block in the third time-frequency resource block.

In one embodiment, the first condition set comprises a first condition; the first condition comprises: the first index being the same as the second index.

In one subembodiment of the above embodiment, the first condition set only comprises the first condition.

In one subembodiment of the above embodiment, the first condition set comprises more than one condition, and the first condition is a condition in the first condition set.

In one subembodiment of the above embodiment, the first condition set comprises more than one condition, and the first condition is a condition in the first condition set; when any condition in the first condition set is satisfied, the first condition set is satisfied; and when each condition in the first condition set is not satisfied, the first condition set is not satisfied.

In one subembodiment of the above embodiment, the first condition set comprises more than one condition, and the first condition is a condition in the first condition set; when each condition in the first condition set is satisfied, the first condition set is satisfied; and when any condition in the first condition set is not satisfied, the first condition set is not satisfied.

In one embodiment, when the first condition set is satisfied, a radio signal is dropped to be transmitted in the second time-frequency resource block and the third time-frequency resource block.

In one embodiment, when the first condition set is not satisfied, the second bit block is dropped to be transmitted in the first time-frequency resource block.

In one embodiment, when the first condition set is not satisfied, a radio signal is dropped to be transmitted in the first time-frequency resource block.

In one embodiment, when the first condition set is satisfied, a first bit block set is transmitted in the first time-frequency resource block, the first bit block set comprises a first bit block and a third bit block, and the second bit block is used to generate the third bit block.

In one subembodiment of the above embodiment, the third bit block comprises the second bit block and a fourth bit block, and the fourth bit block comprises at least one bit.

In one subembodiment of the above embodiment, the third bit block comprises the second bit block and a fourth bit block, and the second bit block is used to generate the fourth bit block.

In one subembodiment of the above embodiment, the third bit block comprises more than one the second bit block.

In one subembodiment of the above embodiment, the third bit block comprises two of the second bit blocks.

In one embodiment, the third information block is semi-statically configured.

In one embodiment, the third information block is carried by a higher-layer signaling.

In one embodiment, the third information block is carried by an RRC signaling.

In one embodiment, the second information block comprises a plurality of IEs in an RRC signaling.

In one embodiment, the third information block comprises an IE in an RRC signaling.

In one embodiment, the third information block comprises partial fields of an IE in an RRC signaling.

In one embodiment, the third information block comprises a PUCCH-SpatialRelationInfo IE in an RRC signaling.

In one embodiment, the third information block comprises a first information sub-block and a second information sub-block, and the first information sub-block and the second information sub-block respectively comprise two IEs in an RRC signaling.

In one embodiment, the third information block comprises a first information sub-block and a second information sub-block, and the first information sub-block and the second information sub-block are respectively carried by two RRC signalings.

In one embodiment, the third information block comprises a first information sub-block and a second information sub-block, and the first information sub-block and the second information sub-block both comprise a PUCCH-SpatialRelationInfo IE in an RRC signaling.

In one embodiment, the specific meaning of the PUCCH-SpatialRelationInfo IE can be found in 3GPP TS38.331, section 6.1.2.3.

In one embodiment, the third information block is carried by a MAC CE signaling.

In one embodiment, the third information block comprises a PUCCH spatial relation Activation/Deactivation MAC CE.

In one embodiment, the third information block comprises an Enhanced PUCCH spatial relation Activation/Deactivation MAC CE.

In one embodiment, the third information block comprises a first information sub-block and a second information sub-block, and the first information sub-block and the second information sub-block respectively comprise two MAC CEs.

In one embodiment, the third information block comprises a first information sub-block and a second information sub-block, and the first information sub-block and the second information sub-block both comprise a PUCCH spatial relation Activation/Deactivation MAC CE.

In one embodiment, the third information block comprises a first information sub-block and a second information sub-block, and the first information sub-block and the second information sub-block both comprise an Enhanced PUCCH spatial relation Activation/Deactivation MAC CE.

In one embodiment, the third information block is used for PUCCH spatial relation Activation/Deactivation.

In one embodiment, the third information block is used for spatial relation Activation/Deactivation.

In one embodiment, the third information block is carried by a DCI signaling.

In one embodiment, a name of the third information block comprises SpatialRelation.

In one embodiment, a name of the third information block comprises SpatialRelationInfo.

In one embodiment, a name of the third information block comprises PUCCH.

In one embodiment, a name of the third information block comprises pucch.

In one embodiment, a name of the third information block comprises spatial relation.

In one embodiment, a name of the third information block comprises PUCCH spatial relation.

In one embodiment, a name of the first information sub-block comprises SpatialRelation.

In one embodiment, a name of the first information sub-block comprises SpatialRelationInfo.

In one embodiment, a name of the first information sub-block comprises PUCCH.

In one embodiment, a name of the first information sub-block comprises pucch.

In one embodiment, a name of the first information sub-block comprises spatial relation.

In one embodiment, a name of the first information sub-block comprises PUCCH spatial relation.

In one embodiment, a name of the second information sub-block comprises SpatialRelation.

In one embodiment, a name of the second information sub-block comprises SpatialRelationInfo.

In one embodiment, a name of the second information sub-block comprises PUCCH.

In one embodiment, a name of the second information sub-block comprises pucch.

In one embodiment, a name of the second information sub-block comprises spatial relation.

In one embodiment, a name of the second information sub-block comprises PUCCH spatial relation.

In one embodiment, the third information block explicitly indicates a first index and a second index.

In one embodiment, the third information block implicitly indicates a first index and a second index.

In one embodiment, the third information block comprises a first information sub-block and a second information sub-block, the first information sub-block is used to indicate a first index, and the second information sub-block is used to indicate a second index.

In one subembodiment of the above embodiment, the first information sub-block explicitly indicates a first index, and the second information sub-block explicitly indicates a second index.

In one subembodiment of the above embodiment, the first information sub-block implicitly indicates a first index, and the second information sub-block implicitly indicates a second index.

In one embodiment, a name of the first index comprises PUCCH-SpatialRelationInfo, and a name of the second index comprises PUCCH-SpatialRelationInfo.

In one embodiment, a name of the first index comprises pucch-SpatialRelationInfoId, and a name of the second index comprises pucch-SpatialRelationInfoId.

In one embodiment, a name of the first index comprises SpatialRelation, and a name of the second index comprises SpatialRelation.

In one embodiment, a name of the first index comprises TCI-StateId, and a name of the second index comprises TCI-StateId.

In one embodiment, a name of the first index comprises tci-StateId, and a name of the second index comprises tci-StateId.

In one embodiment, a name of the first index comprises TCI, and a name of the second index comprises TCI.

In one embodiment, a name of the first index comprises tci, and a name of the second index comprises tci.

In one embodiment, the first index comprises an index of a first reference signal, and the second index comprises an index of a second reference signal.

In one embodiment, a spatial relation of a given resource block is used to transmit a radio signal on the given resource block.

In one subembodiment of the above embodiment, the given resource block is the second time-frequency resource block.

In one subembodiment of the above embodiment, the given resource block is the third time-frequency resource block.

In one subembodiment of the above embodiment, the given resource block is the first time-frequency resource block.

In one subembodiment of the above embodiment, the given resource block is any of the M resource sub-blocks.

In one embodiment, the spatial relation comprises a Transmission Configuration Indicator (TCI) state.

In one embodiment, the spatial relation comprises a Quasi co-location (QCL) parameter.

In one embodiment, the spatial relation comprises a spatial-domain filter.

In one embodiment, the spatial relation comprises a spatial-domain transmission filter.

In one embodiment, the spatial relation comprises a Spatial Tx parameter.

In one embodiment, the Spatial Tx parameter comprise one or more of a transmission antenna port, a transmission antenna port set, a transmission beam, a transmission analog beamforming matrix, a transmission analog beamforming vector, a transmission beamforming matrix, a transmission beamforming vector and a spatial-domain transmission filter.

In one embodiment, the Spatial Rx parameters comprise one or more of a reception beam, a reception analog beamforming matrix, a reception analog beamforming vector, a reception beamforming matrix, a reception beamforming vector and a spatial-domain reception filter.

In one embodiment, the first index is used to indicate a spatial relation of the second time-frequency resource block, and the second index is used to indicate a spatial relation of the third time-frequency resource block.

In one embodiment, the first index explicitly indicates a spatial relation of the second time-frequency resource block, and the second index explicitly indicates a spatial relation of the third time-frequency resource block.

In one embodiment, the first index implicitly indicates a spatial relation of the second time-frequency resource block, and the second index implicitly indicates a spatial relation of the third time-frequency resource block.

In one embodiment, the first index is used to indicate a first reference signal, and the first reference signal is used to determine a spatial relation of the second time-frequency resource block.

In one subembodiment of the above embodiment, the first index explicitly indicates a first reference signal.

In one subembodiment of the above embodiment, the first reference signal comprises one of a Channel State Information-Reference Signal (CSI-RS), a Sounding Reference Signal (SRS) or a Synchronization Signal/Physical Broadcast CHannel (SS/PBCH) Block.

In one subembodiment of the above embodiment, the first reference signal comprises one of a CSI-RS or a SS/PBCH block.

In one subembodiment of the above embodiment, the first reference signal comprises an SRS.

In one subembodiment of the above embodiment, a TCI state of the first reference signal is used to determine a spatial relation of the second time-frequency resource block.

In one subembodiment of the above embodiment, the spatial relation comprises a TCI state, and a TCI state of the first reference signal is the same as a TCI state of the second time-frequency resource block.

In one subembodiment of the above embodiment, a QCL parameter of the first reference signal is used to determine a spatial relation of the second time-frequency resource block.

In one subembodiment of the above embodiment, the spatial relation comprises a QCL parameter, and a QCL parameter of the first reference signal is the same as a QCL parameter of the second time-frequency resource block.

In one subembodiment of the above embodiment, a spatial-domain filter of the first reference signal is used to determine a spatial relation of the second time-frequency resource block.

In one subembodiment of the above embodiment, the spatial relation comprises a spatial-domain filter, and a spatial-domain filter of the first reference signal is the same as a spatial-domain filter of the second time-frequency resource block.

In one subembodiment of the above embodiment, the spatial relation comprises a spatial-domain transmission filter, the first reference signal is an uplink signal, and a spatial-domain transmission filter of the first reference signal is the same as a spatial-domain transmission filter of the second time-frequency resource block.

In one subembodiment of the above embodiment, the spatial relation comprises a spatial-domain transmission filter, the first reference signal is a downlink signal, and a spatial-domain reception filter of the first reference signal is the same as a spatial-domain transmission filter of the second time-frequency resource block.

In one subembodiment of the above embodiment, a spatial parameter of the first reference signal is used to determine a spatial relation of the second time-frequency resource block.

In one subembodiment of the above embodiment, the spatial relation comprises a spatial transmission parameter, and a spatial parameter of the first reference signal is the same as a spatial transmission parameter of the second time-frequency resource block.

In one subembodiment of the above embodiment, the spatial relation comprises a spatial transmission parameter, the first reference signal is an uplink signal, and a spatial transmission parameter of the first reference signal is the same as a spatial transmission parameter of the second time-frequency resource block.

In one subembodiment of the above embodiment, the spatial relation comprises a spatial transmission parameter, the first reference signal is a downlink signal, and a spatial reception parameter of the first reference signal is the same as a spatial transmission parameter of the second time-frequency resource block.

In one embodiment, the second index is used to indicate a second reference signal, and the second reference signal is used to determine a spatial relation of the third time-frequency resource block.

In one subembodiment of the above embodiment, the second index explicitly indicates a second reference signal.

In one subembodiment of the above embodiment, the second reference signal comprises one of a Channel State Information-Reference Signal (CSI-RS), a Sounding Reference Signal (SRS) or a Synchronization Signal/Physical Broadcast CHannel (SS/PBCH) Block.

In one subembodiment of the above embodiment, the second reference signal comprises one of a CSI-RS or an SS/PBCH block.

In one subembodiment of the above embodiment, the second reference signal comprises an SRS.

In one subembodiment of the above embodiment, a TCI state of the second reference signal is used to determine a spatial relation of the third time-frequency resource block.

In one subembodiment of the above embodiment, the spatial relation comprises a TCI state, and a TCI state of the second reference signal is the same as a TCI state of the third time-frequency resource block.

In one subembodiment of the above embodiment, a QCL parameter of the second reference signal is used to determine a spatial relation of the third time-frequency resource block.

In one subembodiment of the above embodiment, the spatial relation comprises a QCL parameter, and a QCL parameter of the second reference signal is the same as a QCL parameter of the third time-frequency resource block.

In one subembodiment of the above embodiment, a spatial-domain filter of the second reference signal is used to determine a spatial relation of the third time-frequency resource block.

In one subembodiment of the above embodiment, the spatial relation comprises a spatial-domain filter, and a spatial-domain filter of the second reference signal is the same as a spatial-domain filter of the third time-frequency resource block.

In one subembodiment of the above embodiment, the spatial relation comprises a spatial-domain transmission filter, the second reference signal is an uplink signal, and a spatial-domain transmission filter of the second reference signal is the same as a spatial-domain transmission filter of the third time-frequency resource block.

In one subembodiment of the above embodiment, the spatial relation comprises a spatial-domain transmission filter, the second reference signal is a downlink signal, and a spatial-domain reception filter of the second reference signal is the same as a spatial-domain transmission filter of the third time-frequency resource block.

In one subembodiment of the above embodiment, a spatial parameter of the second reference signal is used to determine a spatial relation of the third time-frequency resource block.

In one subembodiment of the above embodiment, the spatial relation comprises a spatial transmission parameter, and a spatial parameter of the second reference signal is the same as a spatial transmission parameter of the third time-frequency resource block.

In one subembodiment of the above embodiment, the spatial relation comprises a spatial transmission parameter, the second reference signal is an uplink signal, and a spatial transmission parameter of the second reference signal is the same as a spatial transmission parameter of the third time-frequency resource block.

In one subembodiment of the above embodiment, the spatial relation comprises a spatial transmission parameter, the second reference signal is a downlink signal, and a spatial reception parameter of the second reference signal is the same as a spatial transmission parameter of the third time-frequency resource block.

In one embodiment, the downlink reference signal comprises one of a CSI-RS or an SS/PBCH block.

In one embodiment, the uplink reference signal comprises an SRS.

Embodiment 2

Figure 2:
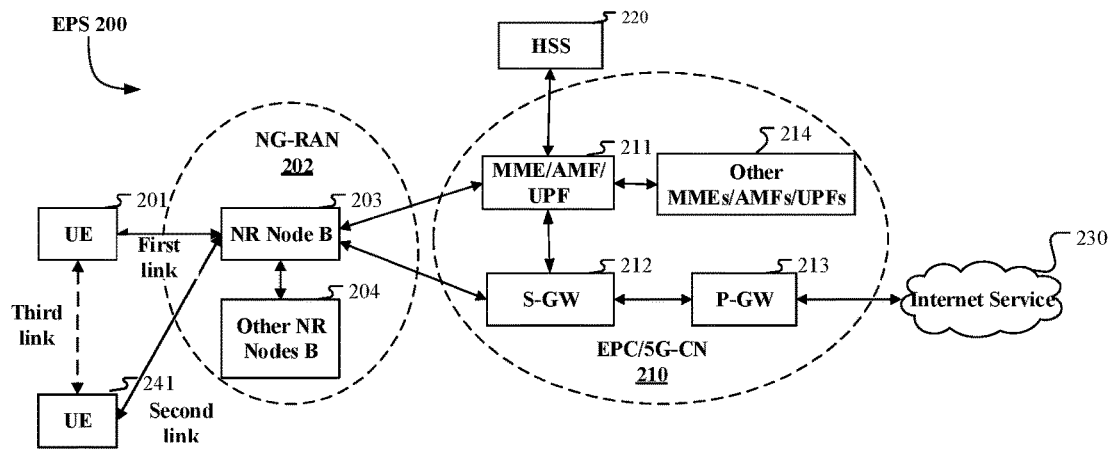
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
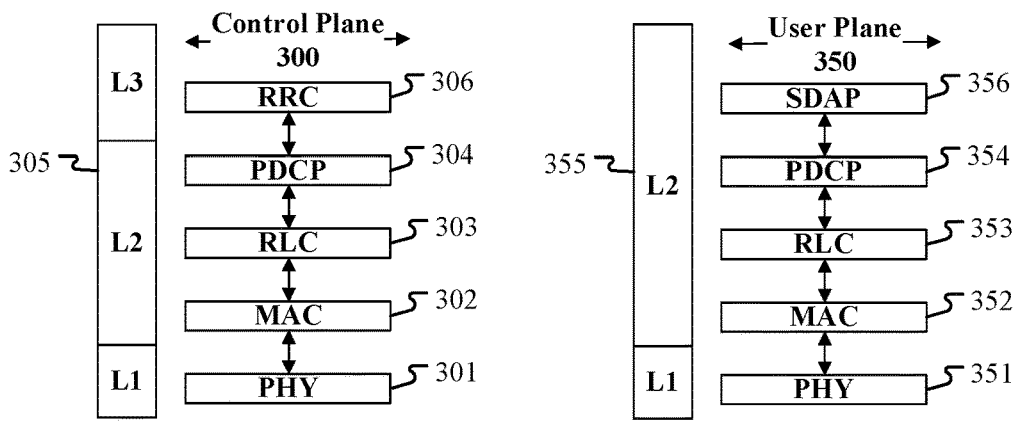
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information block in the present disclosure is generated by the RRC sublayer 306.

In one embodiment, the first information block in the present disclosure is generated by the MAC sublayer 302.

In one embodiment, the first information block in the present disclosure is generated by the MAC sublayer 352.

In one embodiment, the first information block in the present disclosure is generated by the PHY 301.

In one embodiment, the first information block in the present disclosure is generated by the PHY351.

In one embodiment, the second information block in the present disclosure is generated by the RRC sublayer 306.

In one embodiment, the second information block in the present disclosure is generated by the MAC sublayer 302.

In one embodiment, the second information block in the present disclosure is generated by the MAC sublayer 352.

In one embodiment, the second information block in the present disclosure is generated by the PHY 301.

In one embodiment, the second information block in the present disclosure is generated by the PHY351.

In one embodiment, the third information block in the present disclosure is generated by the RRC sublayer 306.

In one embodiment, the third information block in the present disclosure is generated by the MAC sublayer 302.

In one embodiment, the third information block in the present disclosure is generated by the MAC sublayer 352.

In one embodiment, the third information block in the present disclosure is generated by the PHY 301.

In one embodiment, the third information block in the present disclosure is generated by the PHY 351.

In one embodiment, the fourth information block in the present disclosure is generated by the RRC sublayer 306.

In one embodiment, the fourth information block in the present disclosure is generated by the MAC sublayer 302.

In one embodiment, the fourth information block in the present disclosure is generated by the MAC sublayer 352.

In one embodiment, the fourth information block in the present disclosure is generated by the PHY 301.

In one embodiment, the fourth information block in the present disclosure is generated by the PHY351.

In one embodiment, the first reference signal in the present disclosure is generated by the PHY 301.

In one embodiment, the first reference signal in the present disclosure is generated by the PHY 351.

In one embodiment, the second reference signal in the present disclosure is generated by the PHY 301.

In one embodiment, the second reference signal in the present disclosure is generated by the PHY 351.

In one embodiment, the first signal in the present disclosure is generated by the PHY 301.

In one embodiment, the first signal in the present disclosure is generated by the PHY 351.

In one embodiment, the first bit block in the present disclosure is generated by the PHY 301.

In one embodiment, the first bit block in the present disclosure is generated by the PHY 351.

In one embodiment, the first bit block in the present disclosure is generated by the RRC sublayer 306.

In one embodiment, the first bit block in the present disclosure is generated by the MAC sublayer 302.

In one embodiment, the first bit block in the present disclosure is generated by the MAC sublayer 352.

In one embodiment, the second bit block in the present disclosure is generated by the PHY 301.

In one embodiment, the second bit block in the present disclosure is generated by the PHY 351.

In one embodiment, the first behavior in the present disclosure is executed at the PHY 301.

In one embodiment, the first behavior in the present disclosure is executed at the PHY 351.

Embodiment 4

Figure 4:
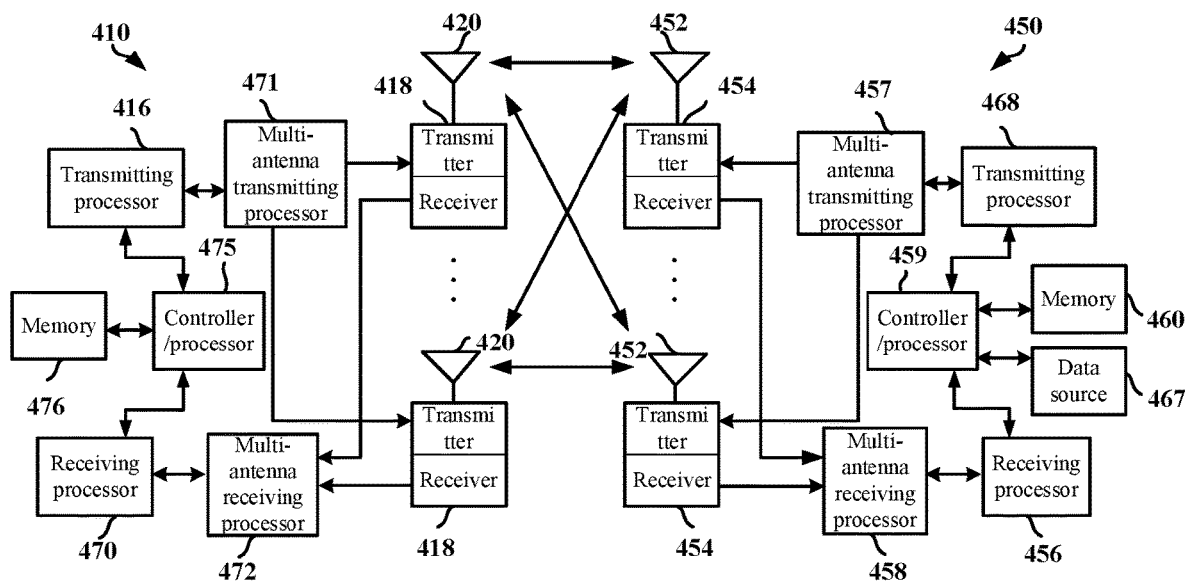
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information block, a second information block and a third information block; when a first condition set is satisfied, transmits a first bit block and a second bit block in a first time-frequency resource block, drops transmitting the second bit block in a second time-frequency resource block, and drops transmitting the second bit block in a third time-frequency resource block; when the first condition set is not satisfied, drops transmitting the first bit block in the first time-frequency resource block, transmits the second bit block in the second time-frequency resource block, and transmits the second bit block in the third time-frequency resource block; herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first information block, a second information block and a third information block; when a first condition set is satisfied, transmitting a first bit block and a second bit block in a first time-frequency resource block, dropping transmitting the second bit block in a second time-frequency resource block, and dropping transmitting the second bit block in a third time-frequency resource block; when the first condition set is not satisfied, dropping transmitting the first bit block in the first time-frequency resource block, transmitting the second bit block in the second time-frequency resource block, and transmitting the second bit block in the third time-frequency resource block; herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one subembodiment of the above embodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information block, a second information block and a third information block; when a first condition set is satisfied, receives a first bit block and a second bit block in a first time-frequency resource block, drops receiving the second bit block in a second time-frequency resource block, and drops receiving the second bit block in a third time-frequency resource block; when the first condition set is not satisfied, drops receiving the first bit block in the first time-frequency resource block, receives the second bit block in the second time-frequency resource block, and receives the second bit block in the third time-frequency resource block; herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first information block, a second information block and a third information block; when a first condition set is satisfied, receiving a first bit block and a second bit block in a first time-frequency resource block, dropping receiving the second bit block in a second time-frequency resource block, and dropping receiving the second bit block in a third time-frequency resource block; when the first condition set is not satisfied, dropping receiving the first bit block in the first time-frequency resource block, receiving the second bit block in the second time-frequency resource block, and receiving the second bit block in the third time-frequency resource block; herein, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the fourth information block in the present disclosure.

In one embodiment, at least one of the antenna 420, the transmitter 418, the multi-antenna transmitting processor 471, the transmitting processor 416, the controller/processor 475, or the memory 476 is used to transmit the fourth information block in the present disclosure.

In one embodiment, at least one of the antenna 452, the receiver 454, the multi-antenna receiving processor 458, the receiving processor 456, the controller/processor 459, the memory 460, or the data source 467 is used to receive the first reference signal in the present disclosure.

In one embodiment, at least one of the antenna 420, the transmitter 418, the multi-antenna transmitting processor 471, the transmitting processor 416, the controller/processor 475, or the memory 476 is used to transmit the first reference signal in the present disclosure.

In one embodiment, at least one of the antenna 452, the receiver 454, the multi-antenna receiving processor 458, the receiving processor 456, the controller/processor 459, the memory 460, or the data source 467 is used to receive the second reference signal in the present disclosure.

In one embodiment, at least one of the antenna 420, the transmitter 418, the multi-antenna transmitting processor 471, the transmitting processor 416, the controller/processor 475, or the memory 476 is used to transmit the second reference signal in the present disclosure.

In one embodiment, at least one of the antenna 452, the receiver 454, the multi-antenna receiving processor 458, the receiving processor 456, the controller/processor 459, the memory 460, or the data source 467 is used to receive the first information block, the second information block and the third information block in the present disclosure.

In one embodiment, at least one of the antenna 420, the transmitter 418, the multi-antenna transmitting processor 471, the transmitting processor 416, the controller/processor 475, or the memory 476 is used to transmit the first information block, the second information block and the third information block in the present disclosure.

In one embodiment, at least one of the antenna 452, the receiver 454, the multi-antenna receiving processor 458, the receiving processor 456, the controller/processor 459, the memory 460, or the data source 467 is used to receive the first signal in the fourth time-frequency resource block in the present disclosure.

In one embodiment, at least one of the antenna 420, the transmitter 418, the multi-antenna transmitting processor 471, the transmitting processor 416, the controller/processor 475, or the memory 476 is used to transmit the first signal in the fourth time-frequency resource block in the present disclosure.

In one embodiment, at least one of the antenna 420, the transmitter 418, the multi-antenna transmitting processor 471, the transmitting processor 416, the controller/processor 475, or the memory 476 is used to execute the first behavior in the present disclosure.

In one embodiment, at least one of the antenna 452, the transmitter 454, the multi-antenna transmitting processor 458, the transmitting processor 468, the controller/processor 459, the memory 460, or the data sources 467 is used to transmit the first reference signal in the present disclosure.

In one embodiment, at least one of the antenna 420, the receiver 418, the multi-antenna receiving processor 472, the receiving processor 470, the controller/processor 475, or the memory 476 is used to receive the first reference signal in the present disclosure.

In one embodiment, at least one of the antenna 452, the transmitter 454, the multi-antenna transmitting processor 458, the transmitting processor 468, the controller/processor 459, the memory 460, or the data sources 467 is used to transmit the second reference signal in the present disclosure.

In one embodiment, at least one of the antenna 420, the receiver 418, the multi-antenna receiving processor 472, the receiving processor 470, the controller/processor 475, or the memory 476 is used to receive the second reference signal in the present disclosure.

In one embodiment, at least one of the antenna 420, the receiver 418, the multi-antenna receiving processor 472, the receiving processor 470, the controller/processor 475, or the memory 476 is used to execute the first behavior in the present disclosure.

In one embodiment, at least one of the antenna 452, the transmitter 454, the multi-antenna transmission processor 458, the transmitting processor 468, the controller/processor 459, the memory 460, or the data source 467 is used to transmit the first bit block and the second bit block number in the first time-frequency resource block in the present disclosure.

In one embodiment, at least one of the antenna 420, the receiver 418, the multi-antenna receiving processor 472, the receiving processor 470, the controller/processor 475, or the memory 476 is used to receive the first bit block and the second bit block number in the first time-frequency resource block in the present disclosure.

In one embodiment, at least one of the antenna 452, the transmitter 454, the multi-antenna transmission processor 458, the transmitting processor 468, the controller/processor 459, the memory 460, or the data source 467 is used to drop transmitting the second bit block in the second time-frequency resource block in the present disclosure, and drops transmitting the second bit block in the third time-frequency resource block in the present disclosure.

In one embodiment, at least one of the antenna 420, the receiver 418, the multi-antenna receiving processor 472, the receiving processor 470, the controller/processor 475, or the memory 476 is used to drop receiving the second bit block in the second time-frequency resource block in the present disclosure, and drops receiving the second bit block in the third time-frequency resource block in the present disclosure.

In one embodiment, at least one of the antenna 452, the transmitter 454, the multi-antenna transmission processor 458, the transmitting processor 468, the controller/processor 459, the memory 460, or the data source 467 is used to drop transmitting the first bit block in the first time-frequency resource block in the present disclosure.

In one embodiment, at least one of the antenna 420, the receiver 418, the multi-antenna receiving processor 472, the receiving processor 470, the controller/processor 475, or the memory 476 is used to drop receiving the first bit block in the first time-frequency resource block in the present disclosure.

In one embodiment, at least one of the antenna 452, the transmitter 454, the multi-antenna transmission processor 458, the transmitting processor 468, the controller/processor 459, the memory 460, or the data source 467 is used to transmit the second bit block in the second time-frequency resource block in the present disclosure, and transmit the second bit block in the third time-frequency resource block in the present disclosure.

In one embodiment, at least one of the antenna 420, the receiver 418, the multi-antenna receiving processor 472, the receiving processor 470, the controller/processor 475, or the memory 476 is used to receive the second bit block in the second time-frequency resource block in the present disclosure, and receive the second bit block in the third time-frequency resource block in the present disclosure.

Embodiment 5

Figure 5:
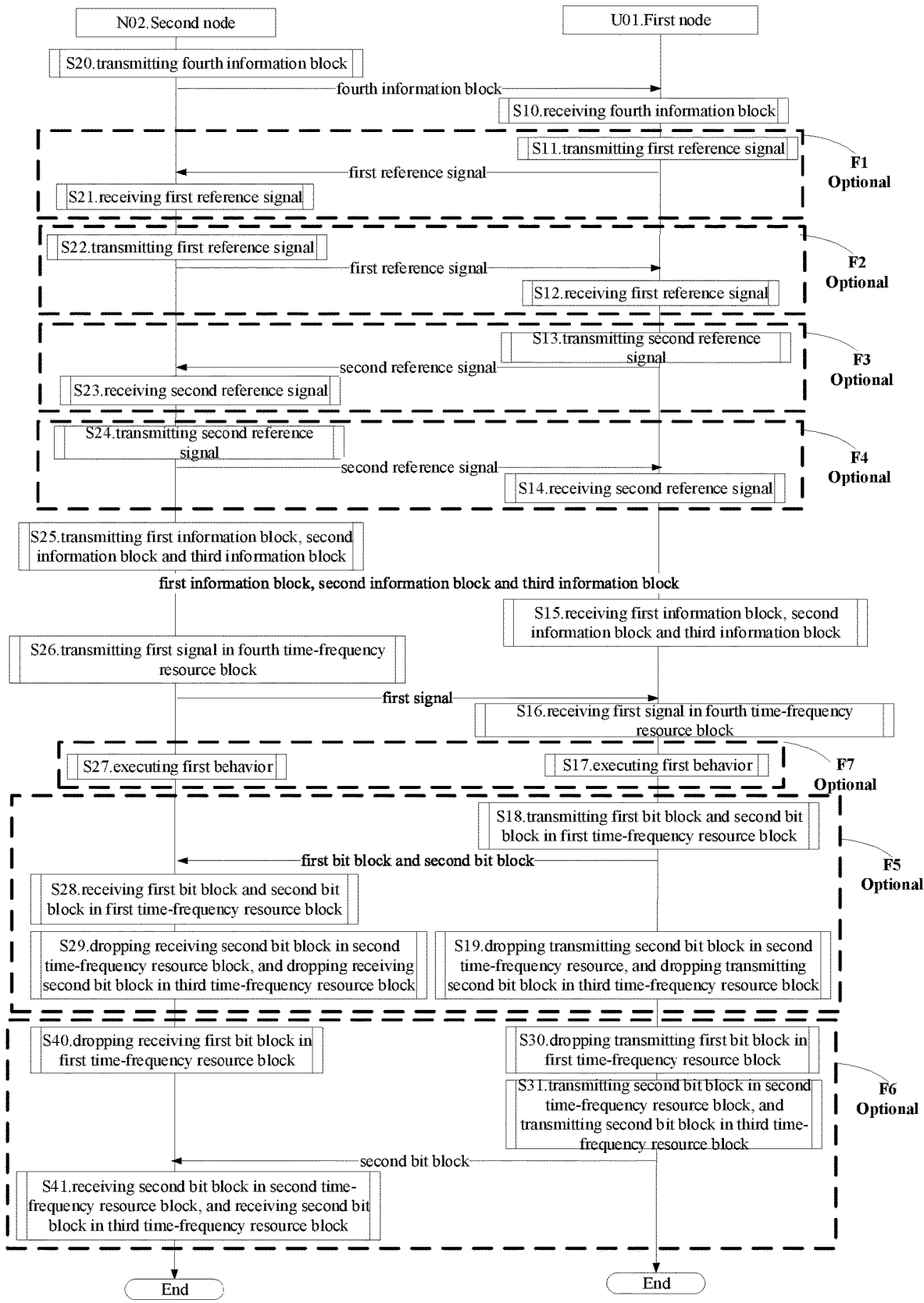
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U01 and a second node N02 are in communications via an air interface. In FIG. 5, steps in dotted boxes marked by F1, F2, F3, F4, F5, F6 and F7 are optional. In FIG. 5, each box represents a step, particularly, the sequential order of steps in these boxes does not necessarily mean that the steps are chronologically arranged.

The first node U01 receives a fourth information block in step S10; transmits a first reference signal in step S11; receives a first reference signal in step S12; transmits a second reference signal in step S13; receives a second reference signal in step S14; receives a first information block, a second information block and a third information block in step S15; receives a first signal in a fourth time-frequency resource block in step S16; executes a first behavior in step S17; transmits a first bit block and a second bit block in a first time-frequency resource block in step S18; drops transmitting a second bit block in a second time-frequency resource block in step S19, and drops transmitting a second bit block in a third time-frequency resource block; drops transmitting a first bit block in a first time-frequency resource block in step S30; transmits a second bit block in a second time-frequency resource block in step S31, and transmits a second bit block in a third time-frequency resource block;

the second node N02 transmits a fourth information block in step S20; receives a first reference signal in step S21; transmits a first reference signal in step S22; receives a second reference signal in step S23; transmits a second reference signal in step S24; transmits a first information block, a second information block and a third information block in step S25; transmits a first signal in a fourth time-frequency resource block in step S26; executes a first behavior in step S27; receives a first bit block and a second bit block in a first time-frequency resource block in step S28; drops receiving a second bit block in a second time-frequency resource block, and drops receiving a second bit block in a third time-frequency resource block in step S29; drops receiving a first bit block in a first time-frequency resource block in step S40; receives a second bit block in a second time-frequency resource block, and receives a second bit block in a third time-frequency resource block in step S41.

In embodiment 5, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit; when the first condition set is satisfied, the first node U01 executes a first behavior; the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time; the fourth information block is used to determine the first time; when the first condition set is satisfied, the first information block is used to indicate that the first behavior is executed; the first index is used to indicate the first reference signal, and the second index is used to indicate the second reference signal; the second information block is used to indicate the fourth time-frequency resource block, and the second bit block is used to indicate whether the first signal is correctly received.

In one embodiment, whether the first condition set is satisfied is used by the first node U01 to determine whether to drop transmitting the first bit block in the first time-frequency resource block.

In one embodiment, whether the first condition set is satisfied is used by the second node N02 to determine whether to drop transmitting the first bit block in the first time-frequency resource block.

In one embodiment, the first index is used by the first node U01 to determine a spatial relation of the second time-frequency resource block, and the second index is used by the first node U01 to determine a spatial relation of the third time-frequency resource block.

In one embodiment, the first index is used by the second node N02 to determine a spatial relation of the second time-frequency resource block, and the second index is used by the second node N02 to determine a spatial relation of the third time-frequency resource block.

In one embodiment, the fourth information block is used by the first node U01 to determine the first time.

In one embodiment, the fourth information block is used by the second node N02 to determine the first time.

In one embodiment, only F1 in boxes marked by F1 and F2 exists, or only F2 in boxes marked by F1 and F2 exists.

In one embodiment, only F3 in boxes marked by F3 and F4 exists, or only F4 in boxes marked by F3 and F4 exists.

In one embodiment, only F5 in boxes marked by F5 and F6 exists, or only F6 in boxes marked by F5 and F6 exists.

In one embodiment, when the first condition set is satisfied, only F5 in boxes marked by F5 and F6 exists.

In one embodiment, when the first condition set is not satisfied, only F6 in boxes marked by F5 and F6 exists.

In one embodiment, when the first condition set is satisfied, only box F7 exists.

In one embodiment, when the first condition set is not satisfied, the box F7 does not exist.

In one embodiment, the first time is a symbol boundary.

In one embodiment, the first time is a sub-slot boundary.

In one embodiment, an end time of the first resource sub-block is the first time.

In one embodiment, an end time of the first resource sub-block is earlier than the first time.

In one embodiment, the first time is pre-defined.

In one embodiment, the first time is pre-configured.

In one embodiment, the first time is configured by a higher-layer signaling.

In one embodiment, the first time is configured by an RRC signaling.

In one embodiment, the first time is indicated by a physical-layer signaling.

In one embodiment, the first time is indicated by a DCI signaling.

In one embodiment, time-domain resources occupied by the first time-frequency resource block are used to determine the first time.

In one embodiment, the first time is a time satisfying a first reference condition in time-domain resources occupied by the first time-frequency resource block; the first reference condition comprises: a size of time-domain resources occupied by the first resource sub-block is the same as a size of time-domain resources occupied by the first resource sub-block.

In one embodiment, the first time is a time satisfying a first reference condition in time-domain resources occupied by the first time-frequency resource block; the first reference condition comprises: a number of symbols occupied by the first resource sub-block is the same as a number of symbols occupied by the first resource sub-block.

In one embodiment, the first time is a time satisfying a first reference condition in time-domain resources occupied by the first time-frequency resource block; the first reference condition comprises: a first difference value is a difference value between a size of time-domain resources occupied by the first resource sub-block and a size of time-domain resources occupied by the first resource sub-block, and an absolute value of the first difference value is minimum.

In one embodiment, the first time is a time satisfying a first reference condition in time-domain resources occupied by the first time-frequency resource block; the first reference condition comprises: a first difference value is a difference value between a number of symbols occupied by the first resource sub-block and a number of symbols occupied by the first resource sub-block, and an absolute value of the first difference value is minimum.

In one embodiment, a size of a time-domain resource is a duration of the time-domain resource.

In one embodiment, a size of a time-domain resource is a number of symbols comprised in the time-domain resource.

In one embodiment, the first time-frequency resource block comprises the first resource sub-block and the second resource sub-block.

In one embodiment, the first time-frequency resource block comprises the first resource sub-block, the second resource sub-block, and time-frequency resources other than the first resource sub-block and the second resource sub-block.

In one embodiment, a start time of the first resource sub-block is earlier than a start time of the second resource sub-block.

In one embodiment, an end time of the first resource sub-block is earlier than a start time of the second resource sub-block.

In one embodiment, the first resource sub-block comprises time-frequency resources in the first time-frequency resource block not later than the first time in time domain, and the second resource sub-block comprises time-frequency resources in the first time-frequency resource block later than the first time in time domain.

In one embodiment, an end time of the second time-frequency resource block is earlier than a start time of the third time-frequency resource block, the second time-frequency resource block overlaps with the first resource sub-block in time domain, the second time-frequency resource block is orthogonal with the second resource sub-block in time domain, the third time-frequency resource block overlaps with the second resource sub-block in time domain, and the third time-frequency resource block is orthogonal with the first resource sub-block in time domain.

In one embodiment, time-domain resources occupied by the second time-frequency resource block and time-domain resources occupied by the first resource sub-block comprise at least one same symbol, any symbol occupied by the second time-frequency resource block in time domain does not belong to time-domain resources occupied by the second resource sub-block, time-domain resources occupied by the third time-frequency resource block and time-domain resources occupied by the second resource sub-block comprise at least one same symbol, and any symbol occupied by the third time-frequency resource block in time domain does not belong to time-domain resources occupied by the first resource sub-block.

In one embodiment, an execution of the first behavior is earlier than transmitting the first bit block and the second bit block in the first time-frequency resource block.

In one embodiment, when the first condition set is satisfied, the phrase of transmitting a first bit block and a second bit block in a first time-frequency resource block includes transmitting a repetition for a first bit block and a second bit block in a first time-frequency resource block.

In one embodiment, when the first condition set is satisfied, the phrase of transmitting a first bit block and a second bit block in a first time-frequency resource block includes transmitting a plurality of repetitions for a first bit block and a second bit block in a first time-frequency resource block.

In one embodiment, when the first condition set is satisfied, the phrase of transmitting a first bit block and a second bit block in a first time-frequency resource block includes transmitting two repetitions of a target bit block set respectively in the first resource sub-block and the second resource sub-block.

In one embodiment, the first node receives a first reference signal, and the first reference signal comprises a downlink reference signal.

In one embodiment, the first node receives a first reference signal, and the first reference signal comprises one of a CSI-RS or an SS/PBCH.

In one embodiment, the first node transmits a first reference signal, and the first reference signal comprises an uplink reference signal.

In one embodiment, the first node transmits a first reference signal, and the first reference signal comprises an SRS.

In one embodiment, the first node receives a second reference signal, and the second reference signal comprises one of a CSI-RS or an SS/PBCH.

In one embodiment, the first node transmits a second reference signal, and the second reference signal comprises an SRS.

In one embodiment, the first node receives a second reference signal, and the second reference signal comprises a downlink reference signal.

In one embodiment, the first node transmits a second reference signal, and the second reference signal comprises an uplink reference signal.

In one embodiment, the first index explicitly indicates the first reference signal.

In one embodiment, the first index implicitly indicates the first reference signal.

In one embodiment, the second index explicitly indicates the second reference signal.

In one embodiment, the second index implicitly indicates the second reference signal.

In one embodiment, the fourth time-frequency resource block comprises at least one RE.

In one embodiment, time-domain resources occupied by the fourth time-frequency resource block comprise at least one symbol.

In one embodiment, time-domain resources occupied by the fourth time-frequency resource block comprise at least one symbol.

In one embodiment, frequency-domain resources occupied by the fourth time-frequency resource block comprise at least one subcarrier.

In one embodiment, frequency-domain resources occupied by the fourth time-frequency resource block comprise at least one PRB.

In one embodiment, frequency-domain resources occupied by the fourth time-frequency resource block comprise at least one RB.

In one embodiment, the first signal comprises data.

In one embodiment, a transmission channel of the first signal is a Downlink Shared Channel (DL-SCH).

In one embodiment, the first signal is transmitted on a PDSCH.

In one embodiment, the first signal carries a reference bit block set, and the reference bit block set comprises at least one bit.

In one subembodiment of the above embodiment, the reference bit block set comprises at least one Transport Block (TB).

In one subembodiment of the above embodiment, the reference bit block set comprises a TB.

In one subembodiment of the above embodiment, the reference bit block set comprises at least one Code Block Group (CBG).

In one subembodiment of the above embodiment, the reference bit block set comprises one CBG.

In one embodiment, the second information block explicitly indicates the fourth time-frequency resource block.

In one embodiment, the second information block implicitly indicates the fourth time-frequency resource block.

In one embodiment, the second information block indicates time-domain resources occupied by the fourth time-frequency resource block and frequency-domain resources occupied by the fourth time-frequency resource block.

In one embodiment, the second information block comprises a sixth field and a seventh field, the sixth field in the second information block indicates time-domain resources occupied by the fourth time-frequency resource block, and the seventh field in the second information block indicates frequency-domain resources occupied by the fourth time-frequency resource block.

In one embodiment, the sixth field is a timeDomainAllocation field, and the seventh field is a frequencyDomainAllocation field.

In one embodiment, the sixth field is a Time domain resource assignment field, and the seventh field is a Frequency domain resource assignment field.

In one embodiment, the second bit block comprises a first bit sub-block, and the first bit sub-block is used to indicate whether the first signal is correctly received.

In one subembodiment of the above embodiment, the first bit sub-block comprises an HARQ-ACK for the first signal.

In one subembodiment of the above embodiment, the first bit sub-block indicates whether each bit block in the reference bit block set carried by the first signal is correctly received.

In one subembodiment of the above embodiment, the second bit block comprises at least one bit sub-block, and any bit sub-block in the second bit block comprises at least one bit.

In one subembodiment of the above embodiment, the second bit block only comprises the first bit sub-block.

In one subembodiment of the above embodiment, the second bit block comprises more than one bit sub-block, and the first bit sub-block is one bit sub-block in the second bit block.

In one embodiment, the second bit block comprises a Hybrid Automatic Repeat reQuest ACKnowledgement (HARQ-ACK) for the first signal.

In one embodiment, the second bit block indicates whether each bit block in the reference bit block set carried by the first signal is correctly received.

In one embodiment, a method in the first node comprises: receiving a fourth information block;

herein, the fourth information block is used to determine the first time.

In one embodiment, a transmission of the fourth information block is earlier than a transmission of the first information block.

In one embodiment, a transmission of the fourth information block is not earlier than a transmission of the first information block.

In one embodiment, a transmission of the first reference signal is earlier than a transmission of the second information block, and a transmission of the second reference signal is earlier than a transmission of the second information block.

In one embodiment, a transmission of the first reference signal is not earlier than a transmission of the second information block, and a transmission of the second reference signal is not earlier than a transmission of the second information block.

In one embodiment, a transmission of the first reference signal is earlier than a transmission of the fourth information block, and a transmission of the second reference signal is earlier than a transmission of the fourth information block.

In one embodiment, a transmission of the first reference signal is not earlier than a transmission of the fourth information block, and a transmission of the second reference signal is not earlier than a transmission of the fourth information block.

In one embodiment, in the first node, an execution of the first behavior is earlier than transmitting the first bit block and the second bit block in the first time-frequency resource block.

In one embodiment, in the second node, an execution of the first behavior is earlier than receiving the first bit block and the second bit block in the first time-frequency resource block.

In one embodiment, in the second node, an execution of the first behavior is not earlier than receiving the first bit block and the second bit block in the first time-frequency resource block.

In one embodiment, in the second node, whether an execution of the first behavior is earlier than receiving the first bit block and the second bit block in the first time-frequency resource block is implementation-related to the second node.

In one embodiment, the first information block and the fourth information block are carried by a same DCI signaling.

In one embodiment, the first information block and the fourth information block are carried by a same RRC signaling.

In one embodiment, the fourth information block is semi-statically configured.

In one embodiment, the fourth information block is carried by a higher-layer signaling.

In one embodiment, the fourth information block is carried by an RRC signaling.

In one embodiment, the fourth information block is carried by a MAC CE signaling.

In one embodiment, the fourth information block comprises a plurality of IEs in an RRC signaling.

In one embodiment, the fourth information block comprises an IE in an RRC signaling.

In one embodiment, the fourth information block comprises partial fields of an IE in an RRC signaling.

In one embodiment, the fourth information block is dynamically configured.

In one embodiment, the fourth information block is carried by a physical-layer signaling.

In one embodiment, the fourth information block is carried by a DCI signaling.

In one embodiment, the fourth information block is used to determine Q candidate times, and the first time is one of the Q candidate times, Q being a positive integer greater than 1.

In one embodiment, the fourth information block is used to indicate Q candidate times, and the first time is one of the Q candidate times, Q being a positive integer greater than 1.

In one embodiment, the fourth information block is used to indicate the first time out of Q candidate times, and the first time is one of the Q candidate times, Q being a positive integer greater than 1.

In one embodiment, the fourth information block indicates an index of the first time in Q candidate times, and the first time is one of the Q candidate times, Q being a positive integer greater than 1.

In one embodiment, the fourth information block is used to indicate the first time.

In one embodiment, the fourth information block explicitly indicates the first time.

In one embodiment, the fourth information block implicitly indicates the first time.

In one embodiment, the fourth information block is used to indicate a length of a symbol.

In one embodiment, the fourth information block is used to indicate a length of a sub-slot.

In one embodiment, a name of the fourth information block comprises SubcarrierSpacing.

In one embodiment, a name of the fourth information block comprises subcarrierSpacing.

In one embodiment, a name of the fourth information block comprises scs.

In one embodiment, a name of the fourth information block comprises SCS.

In one embodiment, a name of the fourth information block comprises subslotLength-ForPUCCH.

In one embodiment, a name of the fourth information block comprises subslot.

In one embodiment, a name of the fourth information block comprises slot.

In one embodiment, the first time is a symbol boundary, and the fourth information block is used to indicate a length of a symbol.

In one embodiment, the first time is a symbol boundary, and the fourth information block is used to indicate a SubCarrier Spacing (SCS) of the symbol.

In one embodiment, the first time is a sub-slot boundary, and the fourth information block is used to indicate a length of a sub-slot.

In one embodiment, a length of a symbol is a duration of the symbol.

In one embodiment, a length of a symbol is determined by an SCS of the symbol.

In one embodiment, a length of a sub-slot is a duration of the sub-slot.

In one embodiment, a length of a sub-slot is a number of symbols occupied by the sub-slot.

Embodiment 6

Figure 6:
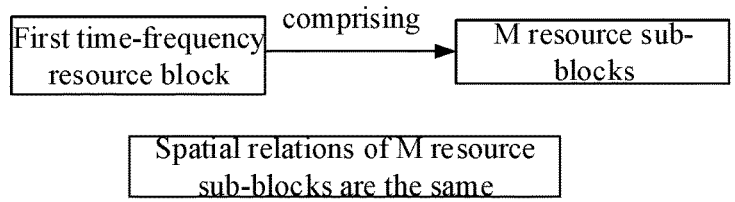
FIG. 6 illustrates a schematic diagram of a spatial relation of a first time-frequency resource block according to one embodiment of the present disclosure.

Embodiment 6 illustrates a schematic diagram of a spatial relation of a first time-frequency resource block, as shown in FIG. 6.

In embodiment 6, the first time-frequency resource block comprises M resource sub-blocks, spatial relations of the M resource sub-blocks are the same, M being a positive integer greater than 1.

In one embodiment, the M resource sub-blocks are respectively M REs.

In one embodiment, any of the M resource sub-blocks comprises at least one RE.

In one embodiment, numbers of REs respectively comprised in the M resource sub-blocks are the same.

In one embodiment, the M resource sub-blocks are orthogonal.

In one embodiment, the M resource sub-blocks are orthogonal in time domain.

In one embodiment, spatial relations of the M resource sub-blocks are the same as a spatial relation of the first time-frequency resource block.

In one embodiment, the first information block is used to indicate a spatial relation of the M resource sub-blocks.

In one embodiment, the first information block is used to indicate the third index.

In one embodiment, the first information block explicitly indicates the third index.

In one embodiment, the first information block implicitly indicates the third index.

In one embodiment, the first information block comprises a fourth field, and the fourth field in the first information block indicates the third index.

In one embodiment, the fourth field comprises at least one bit.

In one embodiment, the fourth field is a Transmission configuration indication field.

In one embodiment, the fourth field is an SRS resource indicator field.

In one embodiment, a name of the fourth field comprises SRS.

In one embodiment, a name of the fourth field comprises srs.

In one embodiment, a name of the fourth field comprises TCI.

In one embodiment, a name of the fourth field comprises tci.

In one embodiment, a name of the fourth field comprises Transmission configuration indication.

In one embodiment, a name of the third index block comprises TCI.

In one embodiment, a name of the third index block comprises tci.

In one embodiment, a name of the third index block comprises SRS.

In one embodiment, a name of the third index block comprises srs.

In one embodiment, the third index comprises an index of a third reference signal.

In one embodiment, the third index is a non-negative integer.

In one embodiment, a third index is used to determine a spatial relation of the first time-frequency resource block.

In one embodiment, a third index is used to indicate a spatial relation of the first time-frequency resource block.

In one embodiment, a third index explicitly indicates a spatial relation of the first time-frequency resource block.

In one embodiment, a third index implicitly indicates a spatial relation of the first time-frequency resource block.

In one embodiment, a third index is used to determine a spatial relation of any one of the M resource sub-blocks.

In one embodiment, a third index is used to indicate a spatial relation of any one of the M resource sub-blocks.

In one embodiment, a third index explicitly indicates a spatial relation of any one of the M resource sub-blocks.

In one embodiment, a third index implicitly indicates a spatial relation of any one of the M resource sub-blocks.

In one embodiment, a third index is used to indicate a third reference signal, and the third reference signal is used to determine a spatial relation of a given resource block.

In one subembodiment of the above embodiment, the given resource block is the first time-frequency resource block.

In one subembodiment of the above embodiment, the given resource block is any of the M resource sub-blocks.

In one subembodiment of the above embodiment, the third reference signal is used to indicate a spatial relation of the given resource block.

In one subembodiment of the above embodiment, the third reference signal explicitly indicates a spatial relation of the given resource block.

In one subembodiment of the above embodiment, the third reference signal implicitly indicates a spatial relation of the given resource block.

In one subembodiment of the above embodiment, the third reference signal is used to determine a spatial relation of the given resource block.

In one subembodiment of the above embodiment, the third reference signal comprises one of a Channel State Information-Reference Signal (CSI-RS), a Sounding Reference Signal (SRS) or a Synchronization Signal/Physical Broadcast CHannel (SS/PBCH) Block.

In one subembodiment of the above embodiment, the third reference signal comprises one of a CSI-RS or an SS/PBCH block.

In one subembodiment of the above embodiment, the third reference signal comprises an SRS.

In one subembodiment of the above embodiment, a TCI state of the third reference signal is used to determine a spatial relation of the given resource block.

In one subembodiment of the above embodiment, the spatial relation comprises a TCI state, and a TCI state of the third reference signal and a TCI state of the given resource block are the same.

In one subembodiment of the above embodiment, a QCL parameter of the third reference signal is used to determine a spatial relation of the given resource block.

In one subembodiment of the above embodiment, the spatial relation comprises a QCL parameter, and a QCL parameter of the third reference signal is the same as a QCL parameter of the given resource block.

In one subembodiment of the above embodiment, a spatial-domain filter of the third reference signal is used to determine a spatial relation of the given resource block.

In one subembodiment of the above embodiment, the spatial relation comprises a spatial-domain filter, and a spatial-domain filter of the third reference signal is the same as a spatial-domain filter of the given resource block.

In one subembodiment of the above embodiment, the spatial relation comprises a spatial-domain transmission filter, the third reference signal is an uplink signal, and a spatial-domain transmission filter of the third reference signal is the same as a spatial-domain transmission filter of the given resource block.

In one subembodiment of the above embodiment, the spatial relation comprises a spatial-domain transmission filter, the third reference signal is a downlink signal, and a spatial-domain reception filter of the third reference signal is the same as a spatial-domain transmission filter of the given resource block.

In one subembodiment of the above embodiment, a spatial parameter of the third reference signal is used to determine a spatial relation of the given resource block.

In one subembodiment of the above embodiment, the spatial relation comprises a spatial transmission parameter, and a spatial parameter of the third reference signal is the same as a spatial transmission parameter of the given resource block.

In one subembodiment of the above embodiment, the spatial relation comprises a spatial transmission parameter, the third reference signal is an uplink signal, and a spatial transmission parameter of the third reference signal is the same as a spatial transmission parameter of the given resource block.

In one subembodiment of the above embodiment, the spatial relation comprises a spatial transmission parameter, the third reference signal is a downlink signal, and a spatial reception parameter of the third reference signal is the same as a spatial transmission parameter of the given resource block.

Embodiment 7

Figure 7:
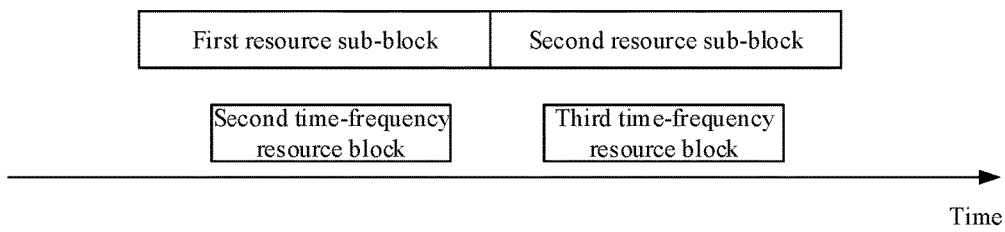
FIG. 7 illustrates a schematic diagram of determining a first time according to one embodiment of the present disclosure.
Figure 7:
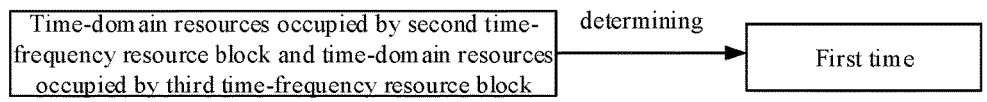

Embodiment 7 illustrates a schematic diagram of determining a first time, as shown in FIG. 7.

In embodiment 7, an end time of the second time-frequency resource block in the present disclosure is earlier than a start time of the third time-frequency resource block in the present disclosure, the second time-frequency resource block overlaps with only the first resource sub-block in the first resource sub-block and the second resource sub-block in the present disclosure in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time.

In one embodiment, the first time is not earlier than an end time of the second time-frequency resource block, and the first time is earlier than a start time of the third time-frequency resource block.

In one embodiment, the first time is later than an end time of the second time-frequency resource block, and the first time is earlier than a start time of the third time-frequency resource block.

In one embodiment, the first time is later than an end time of the second time-frequency resource block, and the first time is not later than a start time of the third time-frequency resource block.

In one embodiment, an end time of the second time-frequency resource block is earlier than a start time of the third time-frequency resource block, and the first time is the end time of the second time-frequency resource block.

In one embodiment, an end time of the second time-frequency resource block is earlier than a start time of the third time-frequency resource block, and the first time is the start time of the third time-frequency resource block.

In one embodiment, the first time is one of the Q candidate times, Q being a positive integer greater than 1.

In one embodiment, selecting the first time out of the Q candidate times is implementation-related to the first node.

In one embodiment, the first node randomly selects the first time out of the Q candidate times.

In one embodiment, the first time is one of Q candidate times, Q being a positive integer greater than 1, and time-domain resources occupied by the second time-frequency resource block and time-domain resources occupied by the third time-frequency resource block are used to determine the first time out of the Q candidate times.

In one embodiment, time-domain resources occupied by the second time-frequency resource block and time-domain resources occupied by the third time-frequency resource block are used to determine Q candidate times, and the first time is one of the Q candidate times, Q being a positive integer greater than 1.

In one embodiment, any of the Q candidate times is not earlier than an end time of the second time-frequency resource block, and any of the Q candidate times is not later than a start time of the third time-frequency resource block.

In one embodiment, any of the Q candidate times is not earlier than an end time of the second time-frequency resource block, and any of the Q candidate times is earlier than a start time of the third time-frequency resource block.

In one embodiment, any of the Q candidate times is later than an end time of the second time-frequency resource block, and any of the Q candidate times is not later than a start time of the third time-frequency resource block.

In one embodiment, any of the Q candidate times is later than an end time of the second time-frequency resource block, and any of the Q candidate times is earlier than a start time of the third time-frequency resource block.

In one embodiment, the Q candidate times are respectively Q symbol boundaries.

In one embodiment, Q symbols are not earlier than an end time of the second time-frequency resource block and not later than a start time of the second time-frequency resource block, and the Q candidate times are boundaries of the Q symbols respectively.

In one embodiment, Q symbols are not earlier than an end time of the second time-frequency resource block and not later than a start time of the second time-frequency resource block, and the Q candidate times are end times of the Q symbols respectively.

In one embodiment, Q symbols are not earlier than an end time of the second time-frequency resource block and not later than a start time of the second time-frequency resource block, and the Q candidate times are start times of the Q symbols respectively.

In one embodiment, the Q candidate times are respectively Q sub-slot boundaries.

In one embodiment, a boundary of any sub-slot in Q sub-slots is not earlier than an end time of the second time-frequency resource block and not later than a start time of the second time-frequency resource block, and the Q candidate times are the boundaries of the Q sub slots respectively.

In one embodiment, an end time of any sub-slot in Q sub-slots is not earlier than an end time of the second time-frequency resource block and not later than a start time of the second time-frequency resource block, and the Q candidate times are respectively end times of the Q sub slots.

In one embodiment, a start time of any of Q sub-slots is not earlier than an end time of the second time-frequency resource block and not later than a start time of the second time-frequency resource block, and the Q candidate times are respectively start times of the Q sub-slots.

In one embodiment, the symbol boundary is an end time of the symbol.

In one embodiment, the symbol boundary is a start time of the symbol.

In one embodiment, a boundary of the sub-slot is an end time of the sub-slot.

In one embodiment, a boundary of the sub-slot is a start time of the sub-slot.

In one embodiment, the Q candidate times are predefined.

In one embodiment, the Q candidate times are preconfigured.

In one embodiment, the Q candidate times are configured by a higher-layer signaling.

In one embodiment, the Q candidate times are configured by an RRC signaling.

In one embodiment, the Q candidate times are indicated by a physical-layer signaling.

In one embodiment, the Q candidate times are indicated by a DCI signaling.

In one embodiment, time-domain resources occupied by the first time-frequency resource block are used to determine the first time out of the Q candidate times.

In one embodiment, the first time is a candidate time satisfying a second reference condition in the Q candidate times; the second reference condition comprises: a size of time-domain resources occupied by the first resource sub-block is the same as a size of time-domain resources occupied by the first resource sub-block.

In one embodiment, the first time is a candidate time satisfying a second reference condition in the Q candidate times; the second reference condition comprises: a number of symbols occupied by the first resource sub-block is the same as a number of symbols occupied by the first resource sub-block.

In one embodiment, the first time is a candidate time satisfying a second reference condition in the Q candidate times; the second reference condition comprises: a second difference value is a difference value between a size of time-domain resources occupied by the first resource sub-block and a size of time-domain resources occupied by the first resource sub-block, and an absolute value of the second difference value is minimum.

In one embodiment, the first time is a candidate time satisfying a second reference condition in the Q candidate times; the second reference condition comprises: a second difference value is a difference value between a number of symbols occupied by the first resource sub-block and a number of symbols occupied by the first resource sub-block, and an absolute value of the second difference value is minimum.

Embodiment 8

Figure 8:
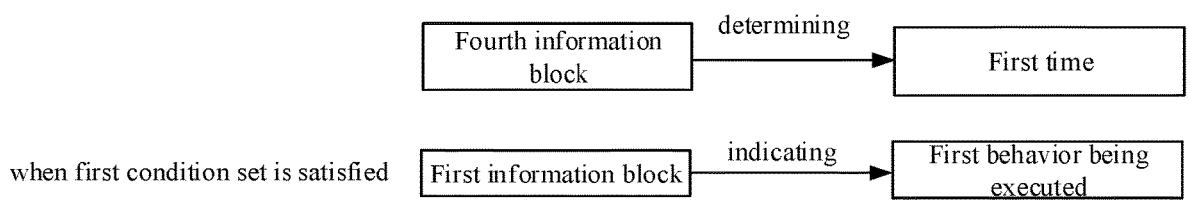
FIG. 8 illustrates a schematic diagram of determining a first time according to another embodiment of the present disclosure.

Embodiment 8 illustrates another schematic diagram of determining a first time, as shown in FIG. 8.

In embodiment 8, the fourth information block in the present disclosure is used to determine the first time; when the first condition set in the present disclosure is satisfied, the first information block in the present disclosure is used to indicate that the first behavior in the present disclosure is executed.

In one embodiment, the first information block is used to indicate the first time out of Q candidate times, and the first time is one of the Q candidate times, Q being a positive integer greater than 1.

In one embodiment, the first information block comprises at least one bit.

In one embodiment, the first information block comprises a fifth field, and the fifth field in the first information block is used to indicate whether the first behavior is execited.

In one embodiment, the fifth field comprises more than one bit.

In one embodiment, the fifth domain comprises one bit.

In one embodiment, when a value of the fifth field is equal to 0, the fifth field indicates executing the first behavior; when a value of the fifth field is equal to 1, the fifth field indicates not executing the first behavior;

In one embodiment, when a value of the fifth field is equal to 1, the fifth field indicates performing the first behavior; when a value of the fifth field is equal to 0, the fifth field indicates not executing the first behavior.

In one embodiment, when the first condition set is satisfied, a value of the fifth field in the first information block is equal to 0.

In one embodiment, when the first condition set is satisfied, a value of the fifth field in the first information block is equal to 1.

In one embodiment, when the first condition set is not satisfied, the first information block is used to determine that the first behavior is not executed.

In one embodiment, when the first condition set is not satisfied, the first information block does not comprise the fifth field.

In one embodiment, when the first condition set is not satisfied, the first information block comprises the fifth field.

In one embodiment, when the first condition set is not satisfied, a value of the fifth value in the first information block is equal to 0, and the first information block is used to determine that the first behavior is not executed.

In one embodiment, when the first condition set is not satisfied, a value of the fifth value in the first information block is equal to 1, and the first information block is used to determine that the first behavior is not executed.

Embodiment 9

Figure 9:
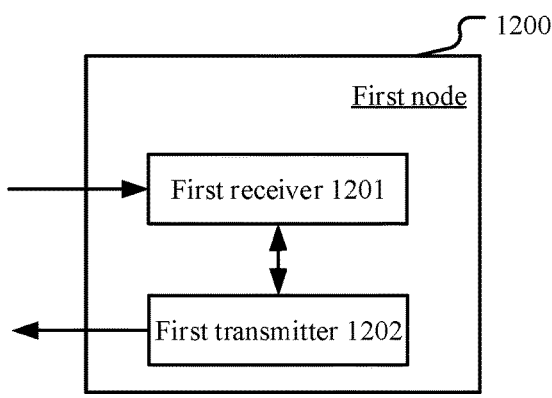
FIG. 9 illustrates a structure block diagram of a processing device in a first node according to one embodiment of the present disclosure.

Embodiment 9 illustrates a structure block diagram of a processing device in a first node, as shown in FIG. 9. In FIG. 9, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1201 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1201 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present disclosure.

In one embodiment, the first transmitter 1202 comprises at least first five the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first four the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first three the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1202 comprises at least first two the antenna 452, the transmitter 454, the multi-antenna transmitting processor 457, the transmitting processor 468, the controller/processor 459, the memory 460, and the data source 467 in FIG. 4 of the present disclosure.

A first receiver 1201 receives a first information block, a second information block and a third information block;

a first transmitter 1202, when a first condition set is satisfied, transmits a first bit block and a second bit block in a first time-frequency resource block, drops transmitting the second bit block in a second time-frequency resource block, and drops transmitting the second bit block in a third time-frequency resource block; when the first condition set is not satisfied, drops transmitting the first bit block in the first time-frequency resource block, transmits the second bit block in the second time-frequency resource block, and transmits the second bit block in the third time-frequency resource block.

In embodiment 9, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one embodiment, the first time-frequency resource block comprises M resource sub-blocks, spatial relations of the M resource sub-blocks are the same, M being a positive integer greater than 1.

In one embodiment, when the first condition set is satisfied, the first transmitter 1202 executes a first behavior; herein, the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

In one embodiment, an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time.

In one embodiment, the first receiver 1201 receives a fourth information block; herein, the fourth information block is used to determine the first time; when the first condition set is satisfied, the first information block is used to indicate that the first behavior is executed.

In one embodiment, the first transmitter 1202 transmits a first reference signal, or, the first receiver 1201 receives a first reference signal; the first transmitter 1202 transmits a second reference signal, or, the first receiver 1201 receives a second reference signal; herein, the first index is used to indicate the first reference signal, and the second index is used to indicate the second reference signal.

In one embodiment, the first receiver 1201 receives a first signal in a fourth time-frequency resource block; herein, the second information block is used to indicate the fourth time-frequency resource block, and the second bit block is used to indicate whether the first signal is correctly received.

Embodiment 10

Figure 10:
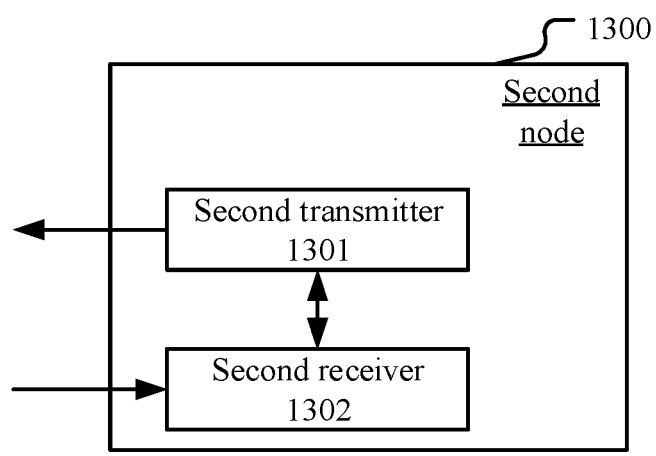
FIG. 10 illustrates a structure block diagram of a processing device in a second node according to one embodiment of the present disclosure.

Embodiment 10 illustrates a structure block diagram of a processing device in a second node, as shown in FIG. 10. In FIG. 10, a second node processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1302 comprises at least first five of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first four of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first three of the antenna 420, the receiver 418, the multi-antenna receiving processor 472, the receiving processor 470, the controller/processor 475 and the memory 476 in FIG. 4 of the present disclosure.

In one embodiment, the second receiver 1302 comprises at least first two of the antenna 420, the receiver 418, the multi-antenna receiving processor 472, the receiving processor 470, the controller/processor 475 and the memory 476 in FIG. 4 of the present disclosure.

A second transmitter 1301 transmits a first information block, a second information block and a third information block;

a second receiver 1302, when a first condition set is satisfied, receives a first bit block and a second bit block in a first time-frequency resource block, drops receiving the second bit block in a second time-frequency resource block, and drops receiving the second bit block in a third time-frequency resource block; when the first condition set is not satisfied, drops receiving the first bit block in the first time-frequency resource block, receives the second bit block in the second time-frequency resource block, and receives the second bit block in the third time-frequency resource block;

In embodiment 10, the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block; the third information block is used to indicate a first index and a second index, the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

In one embodiment, the first time-frequency resource block comprises M resource sub-blocks, spatial relations of the M resource sub-blocks are the same, M being a positive integer greater than 1.

In one embodiment, when the first condition set is satisfied, the second receiver 1302 performs a first behavior; herein, the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

In one embodiment, an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time.

In one embodiment, the second transmitter 1301 transmits a fourth information block; herein, the fourth information block is used to determine the first time; when the first condition set is satisfied, the first information block is used to indicate that the first behavior is executed.

In one embodiment, the second receiver 1302 receives a first reference signal, or, the second transmitter 1301 transmits a first reference signal; the second receiver 1302 receives a second reference signal, or, the second transmitter 1301 transmits a second reference signal; herein, the first index is used to indicate the first reference signal, and the second index is used to indicate the second reference signal.

In one embodiment, the second transmitter 1301 transmits a first signal in a fourth time-frequency resource block; herein, the second information block is used to indicate the fourth time-frequency resource block, and the second bit block is used to indicate whether the first signal is correctly received.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IoT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first information block, a second information block and a third information block; and
a first transmitter, when a first condition set is satisfied, transmitting a first bit block and a second bit block in a first time-frequency resource block, dropping transmitting the second bit block in a second time-frequency resource block, and dropping transmitting the second bit block in a third time-frequency resource block; when the first condition set is not satisfied, dropping transmitting the first bit block in the first time-frequency resource block, transmitting the second bit block in the second time-frequency resource block, and transmitting the second bit block in the third time-frequency resource block;
the first transmitter transmits a first reference signal, or the first receiver receives a first reference signal;
the first transmitter transmits a second reference signal, or the first receiver receives a second reference signal;
wherein the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block, the third information block is used to indicate a first index and a second index, the first index is used to indicate the first reference signal, and the second index is used to indicate the second reference signal: the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

2. The first node according to claim 1, wherein the first time-frequency resource block comprises M resource sub-blocks, spatial relations of the M resource sub-blocks are the same, M being a positive integer greater than 1.

3. The first node according to claim 1, wherein when the first condition set is satisfied, the first transmitter executes a first behavior; wherein the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

4. The first node according to claim 3, wherein an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time;

or, the first receiver receives a fourth information block; wherein the fourth information block is used to determine the first time; when the first condition set is satisfied, the first information block is used to indicate that the first behavior is executed.

5. The first node according to claim 1, wherein the first receiver receives a first signal in a fourth time-frequency resource block; wherein the second information block is used to indicate the fourth time-frequency resource block, and the second bit block is used to indicate whether the first signal is correctly received.

6. A second node for wireless communications, comprising:
a second transmitter, transmitting a first information block, a second information block and a third information block; and
a second receiver, when a first condition set is satisfied, receiving a first bit block and a second bit block in a first time-frequency resource block, dropping receiving the second bit block in a second time-frequency resource block, and dropping receiving the second bit block in a third time-frequency resource block; when the first condition set is not satisfied, dropping receiving the first bit block in the first time-frequency resource block, receiving the second bit block in the second time-frequency resource block, and receiving the second bit block in the third time-frequency resource block;
the second receiver receives a first reference signal, or the second transmitter transmits a first reference signal;
the second receiver receives a second reference signal, or, the second transmitter transmits a second reference signal;
wherein the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop receiving the first bit block in the first time-frequency resource block, the third information block is used to indicate a first index and a second index, the first index is used to indicate the first reference signal, and the second index is used to indicate the second reference signal; the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

7. The second node according to claim 6, wherein the first time-frequency resource block comprises M resource sub-blocks, spatial relations of the M resource sub-blocks are the same, M being a positive integer greater than 1.

8. The second node according to claim 6, wherein when the first condition set is satisfied, the second receiver executes a first behavior; wherein the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

9. The second node according to claim 8, wherein an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time;
or, the second transmitter transmits a fourth information block; wherein the fourth information block is used to determine the first time; when the first condition set is satisfied, the first information block is used to indicate that the first behavior is executed.

10. The second node according to claim 6, wherein the second transmitter transmits a first signal in a fourth time-frequency resource block; wherein the second information block is used to indicate the fourth time-frequency resource block, and the second bit block is used to indicate whether the first signal is correctly received.

11. A method in a first node for wireless communications, comprising:
receiving a first information block, a second information block and a third information block;
when a first condition set is satisfied, transmitting a first bit block and a second bit block in a first time-frequency resource block, dropping transmitting the second bit block in a second time-frequency resource block, and dropping transmitting the second bit block in a third time-frequency resource block; and
when the first condition set is not satisfied, drops transmitting the first bit block in the first time-frequency resource block, transmitting the second bit block in the second time-frequency resource block, and transmitting the second bit block in the third time-frequency resource block;
transmitting a first reference signal, or receiving a first reference signal;
transmitting a second reference signal, or receiving a second reference signal;
wherein the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop transmitting the first bit block in the first time-frequency resource block, the third information block is used to indicate a first index and a second index, the first index is used to indicate the first reference signal, and the second index is used to indicate the second reference signal; the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

12. The method according to claim 11, wherein the first time-frequency resource block comprises M resource sub-blocks, spatial relations of the M resource sub-blocks are the same, M being a positive integer greater than 1.

13. The method according to claim 11, comprising: when the first condition set is satisfied, executing a first behavior; wherein the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

14. The method according to claim 13, wherein an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time;
or, comprising: receiving a fourth information block; wherein the fourth information block is used to determine the first time; when the first condition set is satisfied, the first information block is used to indicate that the first behavior is executed.

15. The method according to claim 11, wherein comprising:
receiving a first signal in a fourth time-frequency resource block; wherein the second information block is used to indicate the fourth time-frequency resource block, and the second bit block is used to indicate whether the first signal is correctly received.

16. A method in a second node for wireless communications, comprising:
transmitting a first information block, a second information block and a third information block;
receiving a first reference signal, or transmitting a first reference signal;
receiving a second reference signal, or transmitting a second reference signal;
when a first condition set is satisfied, receiving a first bit block and a second bit block in a first time-frequency resource block, dropping receiving the second bit block in a second time-frequency resource block, and dropping receiving the second bit block in a third time-frequency resource block; and
when the first condition set is not satisfied, dropping receiving the first bit block in the first time-frequency resource block, receiving the second bit block in the second time-frequency resource block, and receiving the second bit block in the third time-frequency resource block;
wherein the first information block is used to indicate the first time-frequency resource block, and the first time-frequency resource block is reserved for the first bit block; the second information block is used to indicate the second time-frequency resource block and the third time-frequency resource block, and the second time-frequency resource block and the third time-frequency resource block are respectively reserved for two repetitions of the second bit block; the first time-frequency resource block overlaps with the second time-frequency resource block in time domain, and the first time-frequency resource block overlaps with the third time-frequency resource block in time domain; whether the first condition set is satisfied is used to determine whether to drop receiving the first bit block in the first time-frequency resource block, the third information block is used to indicate a first index and a second index, the first index is used to indicate the first reference signal, and the second index is used to indicate the second reference signal: the first index is used to determine a spatial relation of the second time-frequency resource block, and the second index is used to determine a spatial relation of the third time-frequency resource block; the first condition set comprises: the first index is the same as the second index; the first index is a non-negative integer, and the second index is a non-negative integer; the first bit block comprises at least one bit, and the second bit block comprises at least one bit.

17. The method according to claim 16, wherein the first time-frequency resource block comprises M resource sub-blocks, spatial relations of the M resource sub-blocks are the same, M being a positive integer greater than 1.

18. The method according to claim 16, comprising:
when the first condition set is satisfied, executing a first behavior;
wherein the first behavior comprises: dividing the first time-frequency resource block into a first resource sub-block and a second resource sub-block with a first time as boundary; the first resource sub-block and the second resource sub-block are respectively used for two repetitions of a target bit block set, and the target bit block set comprises the first bit block and the second bit block; the first time belongs to time-domain resources occupied by the first time-frequency resource block, an end time of the first resource sub-block is not later than the first time, and a start time of the second resource sub-block is later than the first time.

19. The method according to claim 18, wherein an end time of the second time-frequency resource block is earlier than a start time of the third time-frequency resource block, the second time-frequency resource block overlaps with only the first resource sub-block in the first resource sub-block and the second resource sub-block in time domain, and the third time-frequency resource block overlaps with only the second resource sub-block in the first resource sub-block and the second resource sub-block in time domain; time-domain resources occupied by the second time-frequency resource block and time-domain resources occupied by the third time-frequency resource block are used to determine the first time;
or, comprising: transmitting a fourth information block; wherein the fourth information block is used to determine the first time; when the first condition set is satisfied, the first information block is used to indicate that the first behavior is executed.

20. The method according to claim 16, comprising:
transmitting a first signal in a fourth time-frequency resource block; wherein the second information block is used to indicate the fourth time-frequency resource block, and the second bit block is used to indicate whether the first signal is correctly received.

* * * * *